(12) United States Patent
Chang et al.

(10) Patent No.: US 12,238,748 B2
(45) Date of Patent: Feb. 25, 2025

(54) COMMUNICATION METHOD AND APPARATUS

(71) Applicant: HUAWEI TECHNOLOGIES CO., LTD., Guangdong (CN)

(72) Inventors: Junren Chang, Beijing (CN); Jifeng Li, Shanghai (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 17/692,348

(22) Filed: Mar. 11, 2022

(65) Prior Publication Data

US 2022/0201678 A1    Jun. 23, 2022

Related U.S. Application Data

(63) Continuation of application No. PCT/CN2020/113104, filed on Sep. 2, 2020.

(30) Foreign Application Priority Data

Sep. 12, 2019    (CN) .......................... 201910866576.9

(51) Int. Cl.
    *H04W 72/51*        (2023.01)
    *H04W 72/02*        (2009.01)
                      (Continued)

(52) U.S. Cl.
    CPC ........... *H04W 72/51* (2023.01); *H04W 72/02* (2013.01); *H04W 72/20* (2023.01); *H04W 72/56* (2023.01); *H04W 76/15* (2018.02)

(58) Field of Classification Search
    CPC ..... H04W 72/51; H04W 72/56; H04W 72/20; H04W 72/02; H04W 76/15
    See application file for complete search history.

(56) References Cited

U.S. PATENT DOCUMENTS 9,648,634 B2    5/2017    Fanous et al.
10,142,818 B2 *    11/2018    Miao ..................... H04W 12/06
(Continued)

FOREIGN PATENT DOCUMENTS

| CN | 105359611 A | 2/2016 |
|---|---|---|
| CN | 105722140 A | 6/2016 |

(Continued)

OTHER PUBLICATIONS

Office Action issued in Chinese Application No. 201910866576.9 on Jul. 27, 2021, 14 pages (with English translation).

(Continued)

*Primary Examiner* — Blake J Rubin
(74) *Attorney, Agent, or Firm* — Fish & Richardson P.C.

(57) ABSTRACT

Example communication methods and apparatus are described. One example method includes determining by a terminal that a first transmission resource conflicts with a second transmission resource. The first transmission resource is a resource used by the terminal to send first information to a first network side device. The first network side device corresponds to a first user identity supported by the terminal. The second transmission resource is a resource used by the terminal to send second information to a second network side device. The second network side device corresponds to a second user identity supported by the terminal. The terminal sends the first information on the first transmission resource. The terminal cancels sending the second information on the second transmission resource. Alternatively, the terminal sends the second information on a third transmission resource, where the third transmission resource is a resource before or after the second transmission resource.

14 Claims, 11 Drawing Sheets

(51) Int. Cl.
*H04W 72/20* (2023.01)
*H04W 72/56* (2023.01)
*H04W 76/15* (2018.01)

(56) References Cited

U.S. PATENT DOCUMENTS

| | | | | |
|---|---|---|---|---|
| 10,623,946 | B1* | 4/2020 | Kumar | H04W 76/16 |
| 2014/0199993 | A1* | 7/2014 | Dhanda | H04W 88/08 |
| | | | | 455/423 |
| 2015/0327159 | A1* | 11/2015 | Gude | H04W 48/18 |
| | | | | 455/434 |
| 2016/0095087 | A1* | 3/2016 | Mohseni | H04W 24/08 |
| | | | | 455/558 |
| 2016/0135213 | A1 | 5/2016 | Zhu et al. | |
| 2016/0198352 | A1* | 7/2016 | Jarrahi Khameneh | |
| | | | | H04L 1/1854 |
| | | | | 370/328 |
| 2016/0315744 | A1* | 10/2016 | Choi | H04L 5/0055 |
| 2017/0026985 | A1* | 1/2017 | Lindoff | H04L 1/0015 |
| 2017/0041976 | A1* | 2/2017 | Van | H04W 76/18 |
| 2017/0324519 | A1* | 11/2017 | Guo | H04L 1/1845 |
| 2018/0160422 | A1* | 6/2018 | Pathak | H04W 76/10 |
| 2018/0288824 | A1* | 10/2018 | Hoepfner | H04W 28/12 |
| 2019/0166475 | A1* | 5/2019 | Nankandiyil | H04W 48/18 |
| 2020/0204981 | A1* | 6/2020 | Oh | H04W 8/183 |
| 2020/0351818 | A1* | 11/2020 | Park | H04W 4/90 |
| 2022/0030488 | A1* | 1/2022 | Han | H04W 36/00698 |
| 2022/0053448 | A1* | 2/2022 | Velev | H04W 8/183 |
| 2022/0158794 | A1* | 5/2022 | Zhang | H04L 5/0051 |
| 2022/0279469 | A1* | 9/2022 | Ingale | H04W 60/005 |
| 2024/0030995 | A1* | 1/2024 | Zhang | H04W 52/281 |

FOREIGN PATENT DOCUMENTS

| | | |
|---|---|---|
| CN | 108206991 A | 6/2018 |
| WO | 2018053746 A1 | 3/2018 |
| WO | 2018121920 A1 | 7/2018 |
| WO | 2018171012 A1 | 9/2018 |

OTHER PUBLICATIONS

Office Action issued in Chinese Application No. 201910866576.9 on Feb. 22, 2022, 15 pages (with English translation).

PCT International Search Report and Written Opinion issued in International Application No. PCT/CN2020/113104 on Dec. 2, 2020, 15 pages (with English translation).

Extended European Search Report issued in European Application No. 20863226.5 on Sep. 9, 2022, 8 pages.

* cited by examiner

COMMUNICATION METHOD AND APPARATUS

CROSS-REFERENCE TO RELATED APPLICATIONS

This application is a continuation of International Application No. PCT/CN2020/113104, filed on Sep. 2, 2020, which claims priority to Chinese Patent Application No. 201910866576.9, filed on Sep. 12, 2019. The disclosures of the aforementioned applications are hereby incorporated by reference in their entireties.

TECHNICAL FIELD

This application relates to the field of communication technologies, and in particular, to a communication method and apparatus.

BACKGROUND

With the development of communication technologies, many mobile terminals (such as mobile phones) have a dual SIM dual standby function. Dual SIM dual standby means that two subscriber identity module (subscriber identity module, SIM) cards are simultaneously installed in one mobile phone, and the two SIM cards can be kept in a standby state and connected to a network simultaneously.

Currently, a dual SIM dual active (dual SIM dual active, DSDA) technology is applied to mobile phones. A DSDA mobile phone has two sets of transmit and receive radio frequencies. In other words, each SIM card has one independent set of transmit and receive radio frequencies. However, costs of configuring the two sets of transmit and receive radio frequencies in the DSDA mobile phone are high, and the two sets of transmit and receive radio frequencies occupy a large layout area and increase a volume of the mobile phone. Currently, a mobile phone supporting dual receive single transmit-DSDS (dual receive-DSDS, DR-DSDS) is provided. Compared with the DSDA mobile phone, the DR-DSDS mobile phone has only one radio frequency transmit (transmit, Tx) channel and two radio frequency receive (receive, Rx) channels. Therefore, two SIM cards need to share one radio frequency Tx channel. For the DR-DSDS mobile phone, costs are reduced, and a layout area occupied by a radio frequency circuit is reduced.

However, because the only one radio frequency Tx channel is configured in the DR-DSDS mobile phone, when one SIM card occupies the radio frequency Tx channel for data transmission, the other SIM card cannot implement data transmission with a network side device without the radio frequency Tx channel. Therefore, when the DR-DSDS mobile phone simultaneously sends data to network side devices corresponding to the two SIM cards, a resource conflict occurs.

SUMMARY

This application provides a communication method and apparatus, to resolve a resource conflict that occurs because there is only one single Tx channel of a DR-DSDS terminal.

According to a first aspect, a communication method is provided. The method is applicable to a terminal, for example, a terminal that supports DR-DSDS. The terminal supports a first user identity and a second user identity. For example, a first SIM card and a second SIM card are installed in the terminal, the first SIM card corresponds to the first user identity, and the second SIM card corresponds to the second user identity. The terminal may communicate with a first network side device by using the first SIM card, and communicate with a second network side device by using the second SIM card. The method includes: The terminal determines that a first transmission resource conflicts with a second transmission resource. The first transmission resource is a resource used by the terminal to send first information to the first network side. The second transmission resource is a resource used by the terminal to send second information to the second network side. The terminal sends the first information on the first transmission resource; and cancels sending the second information on the second transmission resource; or sends the second information on a third transmission resource, where the third transmission resource is a resource before or after the second transmission resource.

The method may be performed by a communication apparatus. The communication apparatus may be a communication device or a communication apparatus, for example, a chip system, that can support the communication device to implement a function required in the method. For example, the communication apparatus is a terminal, a chip system that is disposed in the terminal and that is configured to implement a function of the terminal, or another component configured to implement the function of the terminal.

In this embodiment of this application, the terminal supports the first user identity and the second user identity. The first user identity corresponds to the first network side device, and the second user identity corresponds to the second network side device. At a moment or within a determined time period, the terminal needs to simultaneously transmit data to the first network side device and the second network side device. Because the terminal is configured with only one single transmission Tx path, a resource conflict exists. Therefore, the terminal may preferentially transmit the first information to the first network side device, and then cancel transmitting the second information, or transmit the second information to the second network side device on a new transmission resource, namely, the third transmission resource, to resolve the resource conflict.

With reference to the first aspect, in a possible implementation of the first aspect, the terminal sends first indication information to the second network side device. The first indication information indicates that the first transmission resource of the terminal conflicts with the second transmission resource.

In this embodiment of this application, after determining that the first transmission resource conflicts with the second transmission resource, the terminal may send the first indication information to the second network side device, to indicate that the resource conflict exists in the terminal device. Therefore, the second network side device may perform further processing based on the first indication information, for example, re-allocate a resource for transmitting the second information to the terminal. Therefore, in the communication method provided in this embodiment of this application, a transmission resource conflict that occurs because the terminal is configured with the only one single transmission Tx channel can be resolved.

With reference to the first aspect, in a possible implementation of the first aspect, the terminal sends second indication information to the second network side device. The second indication information indicates that the terminal cancels sending the second information on the second transmission resource.

In this embodiment of this application, after the terminal determines that the first transmission resource conflicts with the second transmission resource, if the terminal preferentially transmits the first information to the first network side device and cancels transmitting the second information on the second transmission resource, the terminal may send the second indication information to the second network side device, to indicate that the terminal cancels transmitting the second information on the second transmission resource. Therefore, the second network side device does not need to receive the second information on the second transmission resource. Alternatively, the second network side device may re-allocate, based on the second indication information, the transmission resource for transmitting the second information to the terminal, or the like. Therefore, in the communication method provided in this embodiment of this application, the transmission resource conflict that occurs because the terminal is configured with the only one single transmission Tx channel can be resolved.

With reference to the first aspect, in a possible implementation of the first aspect, the first indication information includes information about an overlapped resource of the first transmission resource and the second transmission resource, and/or a configuration type of the second information. Alternatively, the second indication information includes information about an overlapped resource of the first transmission resource and the second transmission resource, and/or a configuration type of the second information.

It should be noted that the first indication information or the second indication information may carry the overlapped resource of the first transmission resource and the second transmission resource, and/or the configuration type of the second information, for example, whether the second information is periodically configured or aperiodically configured. Therefore, the second network side device may perform further processing based on the first indication information or the second indication information. For example, the second network side device reconfigures, based on the overlapped resource, a resource for transmitting the second information for the terminal, or determines, based on the configuration information of the second information, whether to reconfigure a resource for transmitting the second information for the terminal. For example, when the configuration type of the second information is periodic configuration, the second network side device does not need to reconfigure the resource. When the configuration type of the second information is aperiodic configuration, the second network side device may reconfigure the resource. Therefore, in the communication method provided in this embodiment of this application, the transmission resource conflict that occurs because the terminal is configured with the only one single transmission Tx channel can be resolved.

With reference to the first aspect, in a possible implementation of the first aspect, the information about the overlapped resource includes a quantity of slots or numbers of slots that overlap, or a quantity of symbols or numbers of symbols that overlap.

It should be understood that the overlapped resource of the first transmission resource and the second transmission resource may be an overlapped resource in time domain. For example, the overlapped resource may be the quantity of slots or numbers of slots that overlap, or the quantity of symbols or numbers of symbols that overlap. This is not limited in this embodiment of this application.

With reference to the first aspect, in a possible implementation of the first aspect, the second indication information carries cancellation reason indication information. The cancellation reason indication information indicates the transmission conflict between the second information and the first information on the single transmission Tx link of the terminal.

In this embodiment of this application, after the terminal determines that the first transmission resource conflicts with the second transmission resource, if the terminal preferentially transmits the first information to the first network side device and cancels transmitting the second information to the second network side device on the second transmission resource, the terminal may send the second indication information to the second network side device, to indicate that the terminal cancels transmitting the second information on the second transmission resource. The second indication information carries the cancellation reason indication information that indicates the conflict that occurs because the terminal is configured with the only one single transmission Tx link. Therefore, in the communication method provided in this embodiment of this application, the transmission resource conflict that occurs because the terminal is configured with the only one single transmission Tx channel can be resolved.

With reference to the first aspect, in a possible implementation of the first aspect, before the terminal sends the first information on the first transmission resource, the terminal further determines that a sending periodicity of the first information is greater than a sending periodicity of the second information; and/or determines that a next sending occasion/moment of the first information is later than a next sending occasion/moment of the second information; and/or determines, based on a type of the first information and a type of the second information, that a priority of the first information is higher than a priority of the second information; and/or determines that the first information is aperiodically triggered, and the second information is periodically triggered.

In this embodiment of this application, a manner in which the terminal determines the priorities of the first information and the second information may include: comparing the sending periodicity of the first information with the sending periodicity of the second information; and/or comparing the next sending occasion/moment of the first information with the next sending occasion/moment of the second information; and/or determining based on the type of the first information and the type of the second information; and/or determining based on whether the first information and the second information are aperiodically triggered or periodically triggered. It should be noted that, in the communication method provided in this embodiment of this application, when the first transmission resource conflicts with the second transmission resource, whether to preferentially send the first information or the second information may be determined based on the priorities of the first information and the second information. In this way, the transmission resource conflict that occurs because the terminal is configured with the only one single transmission Tx path can be resolved.

With reference to the first aspect, in a possible implementation of the first aspect, the first information is first control information, and the second information is second control information.

It should be noted that the communication method provided in this embodiment of this application can resolve a resource conflict that occurs when the terminal needs to simultaneously send control information to the first network side device and the second network side device.

With reference to the first aspect, in a possible implementation of the first aspect, the first control information includes at least one of the following information: an uplink scheduling request SR, channel state information CSI, hybrid automatic repeat request HARQ feedback information, or CSI feedback information. The second control information includes at least one of the following information: an SR, CSI, HARQ feedback information, or CSI feedback information.

It should be noted that the foregoing several types of information are merely examples of the first control information and the second control information, but are not limitations. It should be understood that the communication method provided in this embodiment of this application can resolve a resource conflict that the terminal encounters when the terminal needs to simultaneously send any information to the first network side device and the second network side device.

With reference to the first aspect, in a possible implementation of the first aspect, the first information is HARQ-ACK, and the second information is HARQ-NACK.

In this embodiment of this application, when the terminal needs to simultaneously send the HARQ-ACK to the first network side device and send the HARQ-NACK to the second network side device, a priority of the HARQ-ACK is higher than a priority of the HARQ-NACK. In other words, the terminal preferentially sends the HARQ-ACK. In this way, the first network side device does not configure an unnecessary retransmission resource for the first network side device.

With reference to the first aspect, in a possible implementation of the first aspect, the first information is control information, and the second information is data information. Alternatively, the first information is data information, and the second information is control information.

For example, the terminal may simultaneously send the data information to the first network side device and send the control information to the second network side device, or simultaneously send the control information to the first network side device and send the data information to the second network side device. The communication method provided in this application can resolve the resource conflict that the terminal encounters when the terminal needs to simultaneously send any information to the first network side device and the second network side device.

With reference to the first aspect, in a possible implementation of the first aspect, the terminal sends third indication information to the second network side device. The third indication information is used to indicate the second network side device to receive the second information on the third transmission resource.

It should be understood that, after determining that the first transmission resource conflicts with the second transmission resource, the terminal may send the second information on the new transmission resource, namely, the third transmission resource, and the terminal may send the third indication information to the second network side device, to indicate the second network side device to receive the second information on the third transmission resource. Therefore, in the communication method provided in this embodiment of this application, the transmission resource conflict that occurs because the terminal is configured with the only one single transmission Tx channel can be resolved.

With reference to the first aspect, in a possible implementation of the first aspect, that the third transmission resource is a resource before the second transmission resource includes that the third transmission resource is a resource of a previous periodicity of the second transmission resource; or that the third transmission resource is a resource after the second transmission resource includes that the third transmission resource is a resource of a next periodicity of the second transmission resource.

For example, the third transmission resource may be the resource of the previous periodicity of or the resource of the next periodicity of the second transmission resource. This is not limited in this embodiment of this application. It should be understood that after determining that the first transmission resource conflicts with the second transmission resource, the terminal may send the second information on the new transmission resource, namely, the third transmission resource. Therefore, in the communication method provided in this embodiment of this application, the transmission resource conflict that occurs because the terminal is configured with the only one single transmission Tx channel can be resolved.

With reference to the first aspect, in a possible implementation of the first aspect, before the terminal sends the first information on the first transmission resource, the terminal receives fourth indication information sent by the first network side device. The fourth indication information is used to indicate the terminal to: send control information and cancel sending data information when a transmission resource of the data information conflicts with a transmission resource of the control information; or send data information and cancel sending control information when a transmission resource of the data information conflicts with a transmission resource of the control information.

In this embodiment of this application, the first network side device or the second network side device may preconfigure whether the terminal preferentially sends the control information or the data information. Therefore, when the terminal needs to simultaneously send the data information and the control information to the two network devices, the terminal may determine priorities of the data information and the control information based on preconfiguration. Therefore, in the communication method provided in this embodiment of this application, the transmission resource conflict that occurs because the terminal is configured with the only one single transmission Tx channel can be resolved.

With reference to the first aspect, in a possible implementation of the first aspect, before the terminal receives the fourth indication information sent by the first network side device, the terminal sends a service feature of the data information to the first network side device, so that the first network side device determines, based on the service feature, that the control information is to be sent and sending the data information is to be canceled when the transmission resource of the data information conflicts with the transmission resource of the control information; or determines that the data information is to be sent and sending the control information is to be canceled when the transmission resource of the data information conflicts with the transmission resource of the control information.

It should be noted that, when the terminal needs to simultaneously send the control information to the first network side device and send the data information to the second network side device, the terminal may report the service feature of the data information to the first network side device. The first network side device determines the priorities of the data information and the control information based on the service feature of the data information, and then sends the fourth indication information to the terminal. The fourth indication information indicates the priorities of the data information and the control information. The terminal determines, based on the priorities, whether to preferentially send the data information or the control information. Therefore, in the communication method provided in this embodiment of this application, the transmission resource conflict that occurs because the terminal is configured with the only one single transmission Tx channel can be resolved.

With reference to the first aspect, in a possible implementation of the first aspect, the first transmission resource is an uplink control channel PUCCH resource or an uplink shared channel PUSCH resource; and the second transmission resource is an uplink control channel PUCCH resource or an uplink shared channel PUSCH resource.

It should be understood that a resource used by the terminal to transmit the first information to the first network side device may be a PUCCH resource or a PUSCH resource; and a resource used by the terminal to transmit the second information to the second network side device may be a PUCCH resource or a PUSCH resource. This is not limited in this embodiment of this application.

With reference to the first aspect, in a possible implementation of the first aspect, the third transmission resource is a resource determined by the terminal based on the first transmission resource and the second transmission resource. The terminal sends configuration information of the third transmission resource to the second network side device. The configuration information is carried in the first indication information or the second indication information.

It should be noted that, when determining that the first transmission resource conflicts with the second transmission resource, the terminal may recommend the third transmission resource, and then report the configuration information of the third transmission resource to the second network side device. In this way, the second network side device may receive the second information on the third transmission resource. Therefore, in the communication method provided in this embodiment of this application, the transmission resource conflict that occurs because the terminal is configured with the only one single transmission Tx channel can be resolved.

With reference to the first aspect, in a possible implementation of the first aspect, the first indication information or the second indication information includes the configuration type of the second information, for example, periodic configuration or aperiodic configuration.

For example, the first indication information or the second indication information may further include the configuration type of the second information, for example, periodic configuration or aperiodic configuration. After receiving the first indication information or the second indication information, the second network side device may determine, based on the configuration type of the second information, whether to reconfigure the new transmission resource for the second information. For example, if the second information is periodically sent, the second network side device does not need to reconfigure the new transmission resource for the second information. This is because the second information may still occur in a next periodicity. If the second information is aperiodically sent, the second network side device may reconfigure the new transmission resource for the second information. Because if the second information is aperiodically triggered, the next sending occasion of the second information cannot be determined. Therefore, the new transmission resource may be reconfigured for the second information. Therefore, in the communication method provided in this embodiment of this application, the transmission resource conflict that occurs because the terminal is configured with the only one single transmission Tx channel can be resolved.

It should be understood that the configuration type of the second information may alternatively be carried in other indication information independent of the conflict indication information and the cancellation indication information. This is not limited in this embodiment of this application.

According to a second aspect, another communication method is provided. The method is applicable to a terminal, for example, a terminal that supports DR-DSDS. The terminal supports a first user identity and a second user identity. For example, a first SIM card and a second SIM card are installed in the terminal, the first SIM card corresponds to the first user identity, and the second SIM card corresponds to the second user identity. The terminal may communicate with a first network side device by using the first SIM card, and communicate with a second network side device by using the second SIM card. The method includes: The terminal sends first configuration information to the second network side device. The first configuration information indicates a first transmission resource, indicates an overlapped resource of a first transmission resource and a second transmission resource, or indicates a third transmission resource. The first transmission resource is a resource used by the terminal to send first information to the first network side. The second transmission resource is a resource used by the terminal to send second information to the second network side device. The third transmission resource is a resource recommended by the terminal to be configured by the second network side device. The terminal receives first response information that is sent by the second network side device and that is based on the first configuration information. The first response information indicates a fourth transmission resource that is reconfigured by the second network side device for the terminal and that is used to transmit the second information, or the first response information indicates the second network side device allows the terminal to transmit the second information on the third transmission resource.

In this embodiment of this application, the terminal may send, to the second network side device, configuration information of the first transmission resource that is configured by the first network side device for the terminal, so that the second network side device configures a resource based on the configuration information. Therefore, the second network side device does not configure a resource that conflicts with the first transmission resource. Alternatively, the terminal may send configuration information of the overlapped resource of the first transmission resource and the second transmission resource to the second network side device, so that the second network side device reconfigures a resource based on the configuration information. Alternatively, after recommending the third transmission resource, the terminal may report configuration information of the third transmission resource to the second network side device, and then receive response information sent by the second network side device. The response information indicates the second network side device allows the terminal to transmit the second information on the third transmission resource. Therefore, in the communication method provided in this embodiment of this application, a transmission resource conflict that occurs because the terminal is configured with only one single transmission Tx channel can be resolved.

With reference to the second aspect, in a possible implementation of the second aspect, that the terminal sends first configuration information to the second network side device includes: The terminal sends the first configuration information to the second network side device during or after establishing a connection with the second network side device; or the terminal sends the first configuration information to the second network side device when determining that a conflict exists between data transmission on the first transmission resource and the second transmission resource.

It should be noted that the terminal may send the first configuration information to the second network side device during or after establishing the connection with the second network side device, or when determining that the first transmission resource conflicts with the second transmission resource. Therefore, the second network side device may reconfigure the resource based on the first configuration information, or determine whether to agree to the resource recommended by the terminal. Therefore, in the communication method provided in this embodiment of this application, the transmission resource conflict that occurs because the terminal is configured with the only one single transmission Tx channel can be resolved.

With reference to the second aspect, in a possible implementation of the second aspect, the first information is first control information, and the second information is second control information. Alternatively, the first information is control information, and the second information is data information. Alternatively, the first information is data information, and the second information is control information. Alternatively, both the first information and the second information are data information.

For example, both the first information and the second information may be control information, or both the two are data information, or one is data information, and the other is control information. It should be understood that the communication method provided in this embodiment of this application can resolve a resource conflict that the terminal encounters when the terminal needs to simultaneously send any information to the first network side device and the second network side device.

With reference to the second aspect, in a possible implementation of the second aspect, the first control information includes at least one of the following information: an uplink scheduling request SR, channel state information CSI, hybrid automatic repeat request HARQ feedback information, or CSI feedback information. The second control information includes at least one of the following information: an SR, CSI, HARQ feedback information, or CSI feedback information.

It should be understood that the foregoing is merely examples of the first control information and the second control information, but is not a limitation. It should be understood that the communication method provided in this embodiment of this application can resolve the resource conflict that the terminal encounters when the terminal needs to simultaneously send any information to the first network side device and the second network side device.

With reference to the second aspect, in a possible implementation of the second aspect, the first information is HARQ-ACK, and the second information is HARQ-NACK.

In this embodiment of this application, when the terminal needs to simultaneously send the HARQ-ACK to the first network side device and send the HARQ-NACK to the second network side device, a priority of the HARQ-ACK is higher than a priority of the HARQ-NACK. Therefore, the terminal may preferentially send the HARQ-ACK. In this way, the first network side device does not configure an unnecessary retransmission resource for the first network side device.

According to a third aspect, a communication apparatus is provided. For example, the communication apparatus is the terminal described above. The terminal is configured to perform the method according to any one of the first aspect or the possible implementations of the first aspect. Specifically, the communication apparatus may include modules configured to perform the method according to any one of the first aspect or the possible implementations of the first aspect. For example, the communication apparatus includes a processing module and a transceiver module. For example, the communication apparatus is a terminal, or a chip or another component disposed in a terminal.

The processing module is configured to determine that a first transmission resource conflicts with a second transmission resource, where the first transmission resource is a resource used by the communication apparatus to send first information to a first network side, the first network side device corresponds to a first user identity supported by the communication apparatus, the second transmission resource is a resource used by the communication apparatus to send second information to a second network side device, and the second network side device corresponds to a second user identity supported by the communication apparatus.

The transceiver module is configured to send the first information on the first transmission resource.

The processing module is further configured to cancel sending the second information on the second transmission resource; or the transceiver module is further configured to send the second information on a third transmission resource, where the third transmission resource is a resource before or after the second transmission resource.

With reference to the third aspect, in a possible implementation of the third aspect, the transceiver module is further configured to send first indication information to the second network side device. The first indication information indicates that the first transmission resource of the terminal conflicts with the second transmission resource.

With reference to the third aspect, in a possible implementation of the third aspect, the transceiver module is further configured to send second indication information to the second network side device. The second indication information indicates that the terminal cancels sending the second information on the second transmission resource.

With reference to the third aspect, in a possible implementation of the third aspect, the first indication information includes information about an overlapped resource of the first transmission resource and the second transmission resource, and/or a configuration type of the second information. Alternatively, the second indication information includes information about an overlapped resource of the first transmission resource and the second transmission resource, and/or a configuration type of the second information.

With reference to the third aspect, in a possible implementation of the third aspect, the second indication information carries cancellation reason indication information. The cancellation reason indication information indicates a transmission conflict between the second information and the first information on a single transmission Tx link of the terminal.

With reference to the third aspect, in a possible implementation of the third aspect, the processing module is further configured to: determine that a sending periodicity of the first information is greater than a sending periodicity of the second information; and/or determine that a next sending occasion/moment of the first information is later than a next sending occasion/moment of the second information; and/or determine, based on a type of the first information and a type of the second information, that a priority of the first information is higher than a priority of the second information; and/or determine that the first information is aperiodically triggered, and the second information is periodically triggered.

With reference to the third aspect, in a possible implementation of the third aspect, the first information is first control information, and the second information is second control information.

With reference to the third aspect, in a possible implementation of the third aspect, the first control information includes at least one of the following information: an uplink scheduling request SR, channel state information CSI, hybrid automatic repeat request HARQ feedback information, or CSI feedback information.

The second control information includes at least one of the following information:
  an SR, CSI, HARQ feedback information, or CSI feedback information.

With reference to the third aspect, in a possible implementation of the third aspect, the first information is HARQ-ACK, and the second information is HARQ-NACK.

With reference to the third aspect, in a possible implementation of the third aspect, the first information is control information, and the second information is data information. Alternatively, the first information is data information, and the second information is control information.

According to a fourth aspect, a communication apparatus is provided. For example, the communication apparatus is the terminal described above. The terminal is configured to perform the method according to any one of the second aspect or the possible implementations of the second aspect. Specifically, the communication apparatus may include modules configured to perform the method according to any one of the second aspect or the possible implementations of the second aspect. For example, the communication apparatus includes a receiving module and a sending module. Optionally, the communication apparatus may further include a processing module. For example, the communication apparatus is a terminal, or a chip or another component disposed in a terminal.

The sending module is configured to send first configuration information to a second network side device, where the first configuration information indicates a first transmission resource, indicates an overlapped resource of a first transmission resource and a second transmission resource, or indicates a third transmission resource, the first transmission resource is a resource used by a terminal to send first information to a first network side, the second transmission resource is a resource used by the terminal to send second information to a second network side device, and the third transmission resource is a resource recommended by the terminal to be configured by the second network side device.

The receiving module is configured to receive first response information that is sent by the second network side device and that is based on the first configuration information, where the first response information indicates a fourth transmission resource that is reconfigured by the second network side device for the terminal and that is used to transmit the second information, or the first response information indicates that the second network side device allows the terminal to transmit the second information on the third transmission resource.

The first network side device corresponds to a first user identity supported by the terminal, and the second network side device corresponds to a second user identity supported by the terminal.

With reference to the fourth aspect, in a possible implementation of the third aspect, the sending module is specifically configured to:
  send the first configuration information to the second network side device during or after establishing a connection with the second network side device; or
  send the first configuration information to the second network side device when the processing module determines that a conflict exists between data transmission on the first transmission resource and the second transmission resource.

With reference to the fourth aspect, in a possible implementation of the third aspect, the first information is first control information, and the second information is second control information. Alternatively, the first information is control information, and the second information is data information. Alternatively, the first information is data information, and the second information is control information. Alternatively, both the first information and the second information are data information.

According to a fifth aspect, a communication apparatus is provided. For example, the communication apparatus is the terminal described above. The communication apparatus includes a processor and a transceiver. The processor and the transceiver are coupled to each other, and are configured to implement the method according to the first aspect or the possible implementations of the first aspect. Optionally, the communication apparatus may further include a memory. The processor, the memory, and the transceiver are coupled to each other, and are configured to implement the method according to the first aspect or the possible implementations of the first aspect. For example, the communication apparatus is a terminal, or a chip or another component disposed in a terminal.

The processor is configured to determine that a first transmission resource conflicts with a second transmission resource, where the first transmission resource is a resource used by the communication apparatus to send first information to a first network side, the first network side device corresponds to a first user identity supported by the communication apparatus, the second transmission resource is a resource used by the communication apparatus to send second information to a second network side device, and the second network side device corresponds to a second user identity supported by the communication apparatus.

The transceiver is configured to send the first information on the first transmission resource.

The processor is further configured to cancel sending the second information on the second transmission resource; or the transceiver is further configured to send the second information on a third transmission resource, where the third transmission resource is a resource before or after the second transmission resource.

With reference to the fifth aspect, in a possible implementation of the fifth aspect, the transceiver is further configured to send first indication information to the second network side device. The first indication information indicates that the first transmission resource of the terminal conflicts with the second transmission resource.

With reference to the fifth aspect, in a possible implementation of the fifth aspect, the transceiver is further configured to send second indication information to the second network side device. The second indication information indicates that the terminal cancels sending the second information on the second transmission resource.

With reference to the fifth aspect, in a possible implementation of the fifth aspect, the first indication information includes information about an overlapped resource of the first transmission resource and the second transmission resource, and/or a configuration type of the second information. Alternatively, the second indication information includes information about an overlapped resource of the first transmission resource and the second transmission resource, and/or a configuration type of the second information.

With reference to the fifth aspect, in a possible implementation of the fifth aspect, the second indication information carries cancellation reason indication information. The cancellation reason indication information indicates a transmission conflict between the second information and the first information on a single transmission Tx link of the terminal.

With reference to the fifth aspect, in a possible implementation of the fifth aspect, the processor is further configured to: determine that a sending periodicity of the first information is greater than a sending periodicity of the second information; and/or determine that a next sending occasion/moment of the first information is later than a next sending occasion/moment of the second information; and/or determine, based on a type of the first information and a type of the second information, that a priority of the first information is higher than a priority of the second information; and/or determine that the first information is aperiodically triggered, and the second information is periodically triggered.

With reference to the fifth aspect, in a possible implementation of the fifth aspect, the first information is first control information, and the second information is second control information.

With reference to the fifth aspect, in a possible implementation of the fifth aspect, the first control information includes at least one of the following information: an uplink scheduling request SR, channel state information CSI, hybrid automatic repeat request HARQ feedback information, or CSI feedback information.

The second control information includes at least one of the following information:

an SR, CSI, HARQ feedback information, or CSI feedback information.

With reference to the fifth aspect, in a possible implementation of the fifth aspect, the first information is HARQ-ACK, and the second information is HARQ-NACK.

With reference to the fifth aspect, in a possible implementation of the fifth aspect, the first information is control information, and the second information is data information. Alternatively, the first information is data information, and the second information is control information.

According to a sixth aspect, a communication apparatus is provided. For example, the communication apparatus is the terminal described above. The communication apparatus includes a transceiver. Optionally, the communication apparatus may further include a processor. The processor and the transceiver are coupled to each other, and are configured to implement the method according to the second aspect or the possible implementations of the second aspect. Optionally, the communication apparatus may further include a memory. The processor, the memory, and the transceiver are coupled to each other, and are configured to implement the method according to the second aspect or the possible implementations of the second aspect. For example, the communication apparatus is a terminal, or a chip or another component disposed in a terminal.

The transceiver is configured to send first configuration information to a second network side device, where the first configuration information indicates a first transmission resource, indicates an overlapped resource of a first transmission resource and a second transmission resource, or indicates a third transmission resource, the first transmission resource is a resource used by a terminal to send first information to a first network side, the second transmission resource is a resource used by the terminal to send second information to a second network side device, and the third transmission resource is a resource recommended by the terminal to be configured by the second network side device.

The transceiver is configured to receive first response information that is sent by the second network side device and that is based on the first configuration information, where the first response information indicates a fourth transmission resource that is reconfigured by the second network side device for the terminal and that is used to transmit the second information, or the first response information indicates that the second network side device allows the terminal to transmit the second information on the third transmission resource.

The first network side device corresponds to a first user identity supported by the terminal, and the second network side device corresponds to a second user identity supported by the terminal.

With reference to the sixth aspect, in a possible implementation of the sixth aspect, the transceiver is specifically configured to:

send the first configuration information to the second network side device during or after establishing a connection with the second network side device; or
send the first configuration information to the second network side device when the processing module determines that a conflict exists between data transmission on the first transmission resource and the second transmission resource.

With reference to the sixth aspect, in a possible implementation of the sixth aspect, the first information is first control information, and the second information is second control information. Alternatively, the first information is control information, and the second information is data information. Alternatively, the first information is data information, and the second information is control information. Alternatively, both the first information and the second information are data information.

According to a seventh aspect, a communication apparatus is provided. The communication apparatus may be the terminal in the foregoing method design. For example, the communication apparatus is a chip disposed in a communication device. For example, the communication device is a terminal. The communication apparatus includes: a communication interface, configured to receive and send information, or in other words, configured to communicate with another apparatus; and a processor. The processor is coupled to the communication interface. Optionally, the communication apparatus may further include a memory, configured to store computer-executable program code. Alternatively, the communication apparatus may not include a memory, and the memory may be located outside the communication apparatus. The program code stored in the memory includes instructions. When the processor executes the instructions, the communication apparatus is enabled to perform the method according to any one of the first aspect or the possible implementations of the first aspect.

If the communication apparatus is a communication device, the communication interface may be a transceiver in the communication apparatus, for example, implemented through an antenna, a feeder, and a codec in the communication apparatus. Alternatively, if the communication apparatus is a chip disposed in a communication device, the communication interface may be an input/output interface in the chip, for example, an input/output pin.

According to an eighth aspect, a communication apparatus is provided. The communication apparatus may be the terminal in the foregoing method design. For example, the communication apparatus is a chip disposed in a communication device. For example, the communication device is a terminal. The communication apparatus includes: a communication interface, configured to receive and send information, or in other words, configured to communicate with another apparatus; and a processor. The processor is coupled to the communication interface. Optionally, the communication apparatus may further include a memory, configured to store computer-executable program code. Alternatively, the communication apparatus may not include a memory, and the memory may be located outside the communication apparatus. The program code stored in the memory includes instructions. When the processor executes the instructions, the communication apparatus is enabled to perform the method according to any one of the second aspect or the possible implementations of the second aspect.

If the communication apparatus is a communication device, the communication interface may be a transceiver in the communication apparatus, for example, implemented through an antenna, a feeder, and a codec in the communication apparatus. Alternatively, if the communication apparatus is a chip disposed in a communication device, the communication interface may be an input/output interface in the chip, for example, an input/output pin.

According to a ninth aspect, a communication system is provided, including a first network side device; a second network side device; and the communication apparatus provided in the third aspect, the fourth aspect, the fifth aspect, the sixth aspect, the seventh aspect, or the eighth aspect. The first network side device corresponds to a first user identity supported by the communication apparatus, and the second network side device corresponds to a second user identity supported by the communication apparatus.

According to a tenth aspect, a computer-readable storage medium is provided. The computer-readable storage medium stores a computer program. When the computer program runs on a computer, the computer is enabled to perform the method according to any one of the first aspect or the possible implementations of the first aspect, or the computer is enabled to perform the method according to any one of the second aspect or the possible implementations of the second aspect.

According to an eleventh aspect, a computer program product is provided. The computer program product includes a computer program. When the computer program runs on a computer, the computer is enabled to perform the method according to any one of the first aspect or the possible implementations of the first aspect, or the computer is enabled to perform the method according to any one of the second aspect or the possible implementations of the second aspect.

DESCRIPTION OF EMBODIMENTS

Figure 1:
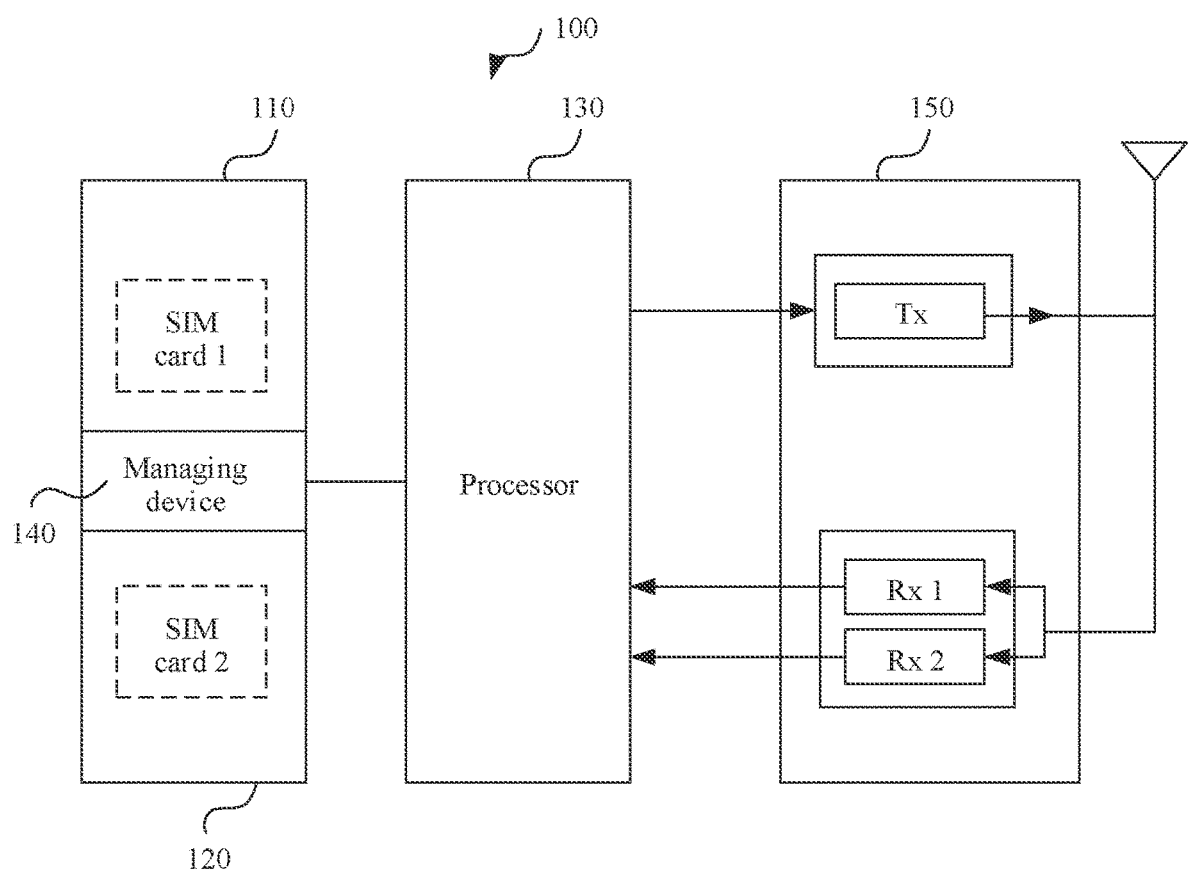
FIG. 1 is a schematic diagram of structural composition of a terminal supporting DR-DSDS according to an embodiment of this application.

To make objectives, technical solutions, and advantages of embodiments of this application clearer, the following further describes the embodiments of this application in detail with reference to accompanying drawings.

The following describes some terms in the embodiments of this application, to facilitate understanding of a person skilled in the art.

(1) A terminal device includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal may communicate with a core network through a radio access network (radio access network, RAN), and exchange a voice or data with the RAN, or exchange a voice and data with the RAN. The terminal may include user equipment (user equipment, UE), a wireless terminal, a mobile terminal, a device-to-device communication (device-to-device, D2D) terminal, a vehicle-to-everything (vehicle to everything, V2X) terminal, a machine-to-machine/machine type communication (machine-to-machine/machine-type communication, M2M/MTC) terminal, an internet of things (internet of things, IoT) terminal, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal may include a mobile phone (or referred to as a "cellular" phone), a computer with a mobile terminal device, or a portable, pocket-sized, hand-held, or computer built-in mobile apparatus. For example, the terminal device may include a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device may alternatively include a limited device, for example, a device with relatively low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

As an example instead of a limitation, in the embodiments of this application, the terminal may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, bands, clothes, and shoes. The wearable device is a portable device that is directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminals described above are located on a vehicle (for example, placed in the vehicle or installed in the vehicle), the terminals may be considered as vehicle-mounted terminals. For example, the vehicle-mounted terminal is also referred to as an on board unit (on-board unit, OBU).

In the embodiments of this application, the terminal may further include a relay (relay). Alternatively, it may be understood that any device that can perform data communication with a base station may be considered as a terminal.

In the embodiments of this application, an apparatus configured to implement a terminal function may be a terminal, or may be an apparatus, for example, a chip system, that can support the terminal in implementing the function. The apparatus may be installed in the terminal. In the embodiments of this application, the chip system may include a chip, or may include a chip and another discrete component. In the technical solutions provided in the embodiments of this application, an example in which an apparatus for implementing a terminal function is a terminal is used to describe the technical solutions provided in the embodiments of this application.

(2) A network side device includes, for example, an access network (access network, AN) device such as a base station (for example, an access point), and may be a device that communicates with a wireless terminal over an air interface through one or more cells in an access network. Alternatively, for example, the network side device in a vehicle-to-everything (vehicle-to-everything, V2X) technology is a road side unit (road side unit, RSU). The base station may be configured to mutually convert a received over-the-air frame and an IP packet, and serve as a router between the terminal and a remaining part of the access network. The remaining part of the access network may include an IP network. The RSU may be a fixed infrastructure entity supporting a V2X application, and may exchange a message with another entity supporting the V2X application. The network side device may further coordinate attribute management of the air interface. For example, the network side device may include an evolved NodeB (NodeB, eNB, or e-NodeB, evolved NodeB) in a long term evolution (long term evolution, LTE) system or a long term evolution-advanced (long term evolution-advanced, LTE-A) system, may include a next generation NodeB (next generation NodeB, gNB) in a 5th generation (the 5th generation, 5G) mobile communication technology new radio (new radio, NR) system (also briefly referred to as an NR system), or may include a centralized unit (centralized unit, CU) and a distributed unit (distributed unit, DU) in a cloud radio access network (cloud radio access network, Cloud RAN) system. This is not limited in the embodiments of this application.

The network side device may further include a core network device, and the core network device includes, for example, an access and mobility management function (access and mobility management function, AMF).

In the embodiments of this application, an apparatus configured to implement a network side device function may be a network side device, or may be an apparatus, for example, a chip system, that can support the network side device in implementing the function. The apparatus may be installed in the network side device. In the technical solutions provided in the embodiments of this application, an example in which an apparatus for implementing a network side device function is a network side device is used to describe the technical solutions provided in the embodiments of this application.

(3) In this embodiment of this application, a "user identity" (for example, a first user identity or a second user identity) is a logical concept. For example, the "user identity" may correspond to a SIM card, subscriber information, a virtual SIM card, or a user identity (such as an international mobile subscriber identity (international mobile subscriber identity, IMSI) or a temporary mobile subscriber identity (temporary mobile subscriber identity, TMSI)). From a perspective of a network side, different "user identities" logically correspond to different communication entities served by the network side. For example, for UE in a 4G system and a 5G system, a terminal supporting two user identities may be considered as two communication entities for the network side. For another example, when the "user identity" corresponds to a SIM card or subscriber information, the network side identifies two terminals supporting different SIM cards or different subscriber information as two different communication entities, and identifies one terminal device supporting a plurality of different SIM cards or a plurality of pieces of subscriber information as a plurality of different communication entities, even though physically the terminal supporting the plurality of different SIM cards or the plurality of pieces of subscriber information is just one physical entity. The embodiments of this application are mainly described by using an example in which the "user identity" corresponds to the SIM card.

For example, the SIM card may be understood as a key for a terminal to access a mobile network. For ease of description, the SIM card and evolution thereof are collectively referred to as a SIM card in the embodiments of this application. For example, the SIM card may be an identity card of a global system for mobile communication (global system for mobile communication, GSM) digital mobile phone user, and is configured to store an identity code and a key of the user, and support authentication performed by a GSM system on the user. For another example, the SIM card may also be a universal subscriber identity module (universal subscriber identity module, USIM), and may also be referred to as an upgraded SIM card.

An embodiment of this application provides a communication method. The method may be applied to a terminal supporting DR-DSDS. The terminal can support at least two user identities, for example, two SIM cards (a first SIM card and a second SIM card) may be installed. One radio frequency Tx channel and two radio frequency Rx channels are configured in the terminal. The first SIM card and the second SIM card in the terminal may occupy one of the two radio frequency Rx channels separately, and use one radio frequency Tx channel in the terminal at different time. FIG. 1 is a schematic diagram of a structure of the terminal supporting DR-DSDS according to the embodiment of this application. As shown in FIG. 1, the terminal 100 may include a first SIM card interface 110, a second SIM card interface 120, a managing device 140 coupled to the first SIM card interface 110 and the second SIM card interface 120, a processor 130 coupled to the managing device 140, and a transceiver 150 connected to the processor 130. The processor 130 may be a baseband processor (baseband processor, BBP). As shown in FIG. 1, the transceiver 150 includes a radio frequency Rx 1 channel, a radio frequency Rx 2 channel, and a radio frequency Tx channel. The first SIM card interface 110 is configured to: install a SIM card 1, and communicate with the SIM card 1. The second SIM card interface 120 is configured to: install a SIM card 2, and communicate with the SIM card 2. The managing device 140 may send, to the processor 130, an uplink data packet related to a service of the SIM card 1, and send an uplink data packet related to a service of the SIM card 2. The processor 130 may send each uplink data packet of the SIM card 1 and each uplink data packet of the SIM card 2 to a network side device on the radio frequency Tx channel.

It should be noted that, the radio frequency Tx channel in this embodiment of this application may be referred to as a Tx radio frequency resource or a transmitter (transmitter), and the radio frequency Rx channel may be referred to as an Rx radio frequency resource or a receiver (receiver). In this embodiment of this application, the radio frequency Tx channel and the radio frequency Rx 1 channel may also be referred to as a primary RF channel, and the radio frequency Rx 2 channel may also be referred to as a secondary RF channel. To be specific, uplink and downlink RF components (for example, the RF Tx channel and the RF Rx 1 channel) in the primary RF channel are multiplexed. Downlink RF components (such as the RF Rx 2 channel) are the only secondary RF channel. Specifically, the communication method provided in this embodiment of this application may be applied to a scenario in which the terminal supporting DR-DSDS needs to use the radio frequency Tx channel to send uplink data of the first SIM card or the SIM card 1 and uplink data of the second SIM card or the SIM card 2 simultaneously.

For example, each of the two SIM cards of the terminal supporting DR-DSDS provided in this embodiment of this application may be a SIM card supporting any one of standards such as a global system for mobile communication (global system for mobile communication, GSM) standard, a universal mobile telecommunication system (universal mobile telecommunication system, UMTS) standard, a time division-synchronous code division multiple access (time division-synchronous code division multiple access, TD-SCDMA) standard, a long term evolution (long term evolution, LTE) standard, and a code division multiple access (code division multiple access, CDMA) standard. For example, the SIM card 1 and the SIM card 2 in the terminal 100 shown in FIG. 1 each may be a SIM card supporting the LTE standard. Alternatively, the SIM card 1 in the terminal 100 shown in FIG. 1 may be a SIM card supporting the LTE standard, and the SIM card 2 of the terminal 100 may be a SIM card supporting the GSM standard. Alternatively, the SIM card 1 and the SIM card 2 in the terminal 100 shown in FIG. 1 each may be a SIM card supporting the GSM standard and the like.

It should be understood that the SIM card 1 in the terminal 100 may be a primary card of the terminal 100, and the SIM card 2 may be a secondary card of the terminal 100, or the SIM card 2 in the terminal 100 may be a primary card of the terminal 100, and the SIM card 1 may be a secondary card of the terminal 100. This is not limited in this embodiment of this application.

Figure 2:
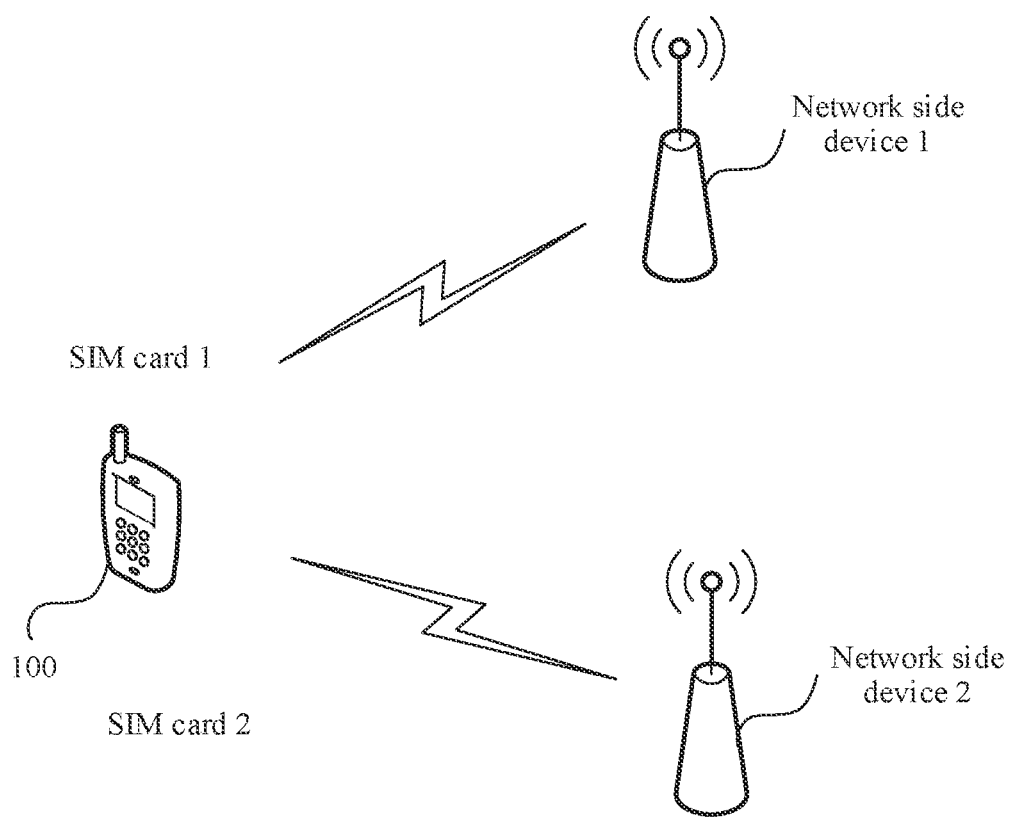
FIG. 2 is a schematic diagram of an application scenario example of a communication method for implementing dual SIM dual active according to an embodiment of this application.

FIG. 2 is a schematic diagram of an application scenario example of a communication method according to an embodiment of this application. A terminal 100 of a user shown in FIG. 2 may be the foregoing terminal supporting DR-DSDS. Two SIM cards, namely, a SIM card 1 and a SIM card 2, may be installed in the terminal 100. If, within a period of time, the terminal 100 needs to send uplink data 1 to a network side device 1 corresponding to the SIM card 1, and needs to send uplink data 2 to a network side device 2 corresponding to the SIM card 2, because only one radio frequency Tx channel is disposed in the terminal 100, a resource conflict occurs when uplink data is sent to the network side device 1 and the network side device 2 simultaneously. Therefore, in the communication method provided in this embodiment of this application, the terminal 100 may determine, according to a priority policy, whether to preferentially send the uplink data 1 of the SIM card 1 to the network side device 1, or preferentially send the uplink data 2 of the SIM card 2 to the network side device 2. For example, the terminal 100 may preferentially send the uplink data of the SIM card 1 to the network side device 1 through the radio frequency Tx channel, and cancel or delay sending the uplink data of the SIM card 2 to the network side device 2, to avoid a conflict in the radio frequency Tx channel.

Figure 3:
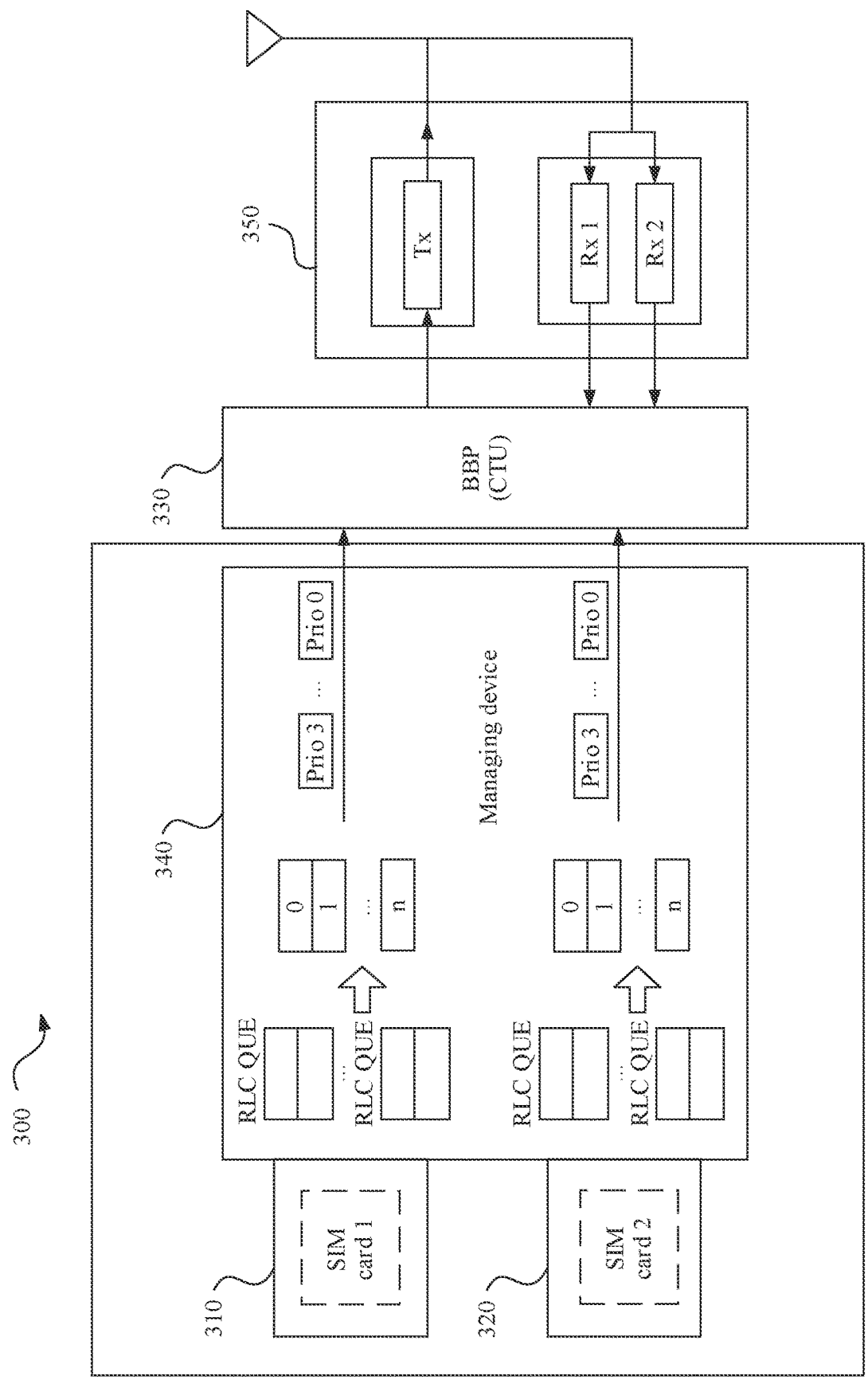
FIG. 3 is a schematic diagram of structural composition of a terminal that supports DR-DSDS and that is in an LTE network according to an embodiment of this application.

FIG. 3 is a schematic diagram of structural composition of a terminal that supports DR-DSDS and that is in an LTE network according to an embodiment of this application. As shown in FIG. 3, the terminal 300 may include a first SIM card interface 310, a second SIM card interface 320, a managing device 340 coupled to the first SIM card interface 310 and the second SIM card interface 320, a BBP 330

(namely, a processor) coupled to the managing device 340, and a transceiver 350 connected to the BBP 330. As shown in FIG. 3, the transceiver 350 includes a radio frequency Rx 1 channel, a radio frequency Rx 2 channel, and a radio frequency Tx channel. The first SIM card interface 310 is configured to: install a SIM card 1, and communicate with the SIM card 1. The second SIM card interface 320 is configured to: install a SIM card 2, and communicate with the SIM card 2. The BBP 330 includes a common time unit (common time unit, CTU). The CTU includes an arbiter configured to determine a transmit priority of uplink data packets. For example, in an LTE network, the terminal 300 may send an uplink data packet to the network side device according to a hybrid automatic repeat request (hybrid automatic repeat request, HARQ) protocol. In this way, even if an uplink data packet of a SLM card (for example, the SIM card 2) sent by the managing device 340 to the BBP 330 is not transmitted in real time, the uplink data packet can be retransmitted according to the HARQ protocol. As shown in FIG. 3, the managing device 340 may send an uplink data packet (prio) in a radio link layer control protocol (radio link control, RLC) queue of the SIM card 1 and the SIM card 2 to the BBP 330 according to the HARQ protocol. The BBP 330 may receive various data packets sent by the managing device 340, for example, an uplink voice packet sent by the SIM card 1 and an uplink signaling packet sent by the SIM card 2. The BBP 330 occupies the radio frequency Tx channel to send uplink data packets to the network device based on a transmit priority of each uplink data packet on the radio frequency Tx channel.

For example, the terminal supporting DR-DSDS in this embodiment of this application may install at least two SIM cards, and may communicate with another communication terminal by using any one of the at least two SIM cards. For example, the terminal may be a dual SIM dual standby mobile phone, a smart band in which two SIM cards can be installed, a smartwatch, or a tablet computer. A specific form of the terminal is not particularly limited in this embodiment of this application. A mobile phone is used as an example in the following embodiments to describe how the terminal supporting DR-DSDS implements specific technical solutions in the embodiments.

Figure 4:
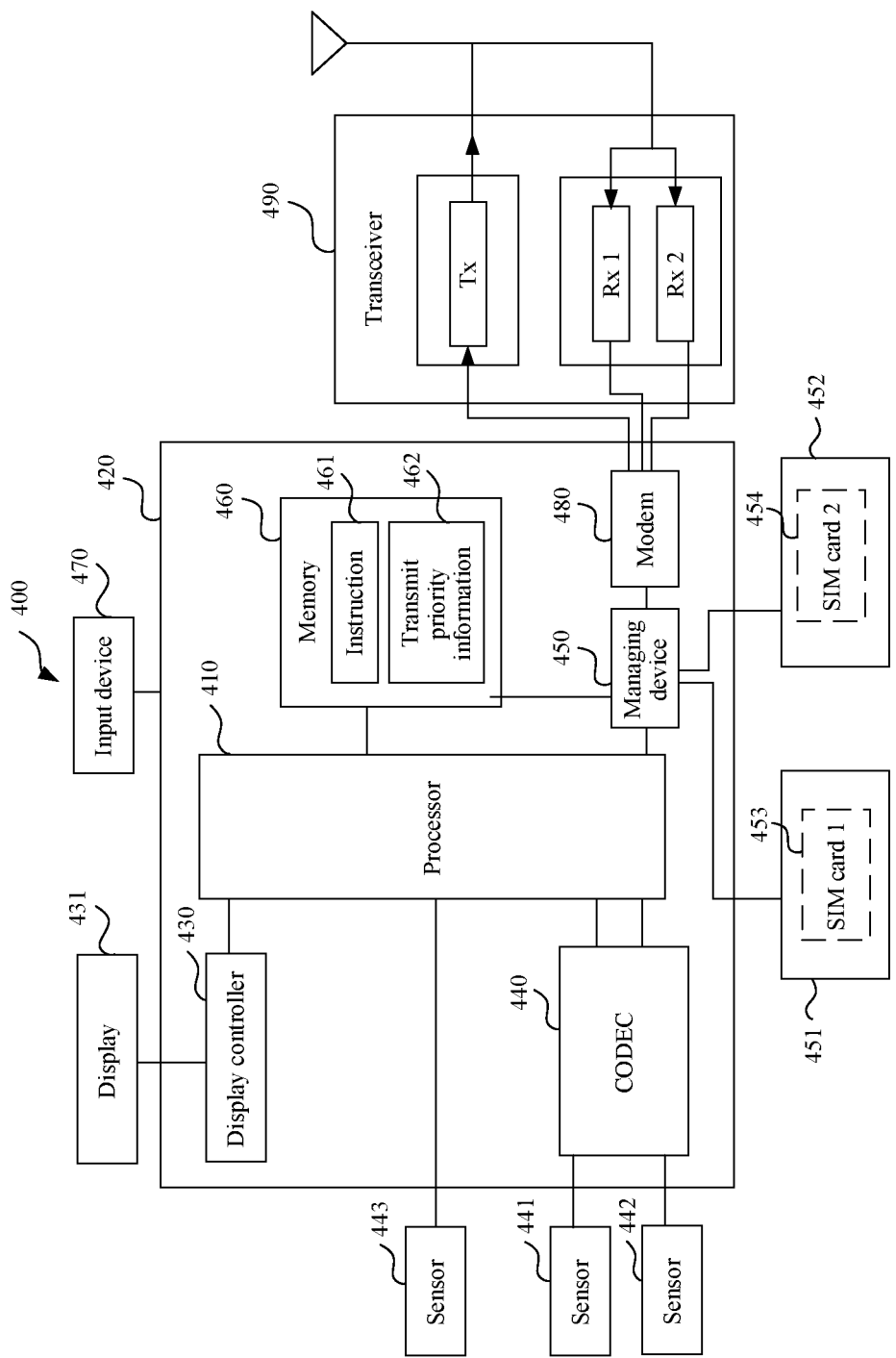
FIG. 4 is a schematic diagram of a hardware structure of a mobile phone according to an embodiment of this application.

As shown in FIG. 4, the terminal in this embodiment may be a mobile phone 400. The following specifically describes the embodiments by using the mobile phone 400 as an example. It should be understood that the mobile phone 400 shown in the figure is merely an example of the terminal supporting DR-DSDS. In addition, the mobile phone 400 may include more or fewer components than those shown in the figure, include a combination of two or more components, or have different component configurations. Various components shown in FIG. 4 may be implemented in hardware, software, or in a combination of hardware and software that includes one or more signal processing and/or application-specific integrated circuits. As shown in FIG. 4, the mobile phone 400 includes a processor 410, a system-on-a-chip device 420, a display controller 430, a codec (CODEC) 440, a managing device 450, a memory 460, an input device 470, a modem 480, a transceiver 490, a power supply 491, and the like. A person skilled in the art may understand that the structure of the mobile phone shown in FIG. 4 does not constitute a limitation on the mobile phone. The mobile phone may include more or fewer components than those shown in the figure, include a combination of some components, or have different component arrangements.

As shown in FIG. 4, the mobile phone 400 may further include a first SIM card interface 451 and a second SIM card interface 452. The first SIM card interface 451 is configured to communicate with a SIM card 1, and the second SIM card interface 452 is configured to communicate with a SIM card 2. For example, the first SIM card interface 451 and the second SIM card interface 452 may be SIM card connectors, including a main body having a SIM card housing space, and a plurality of communication slots configured to connect conductive terminals of a received SIM card. Signaling communication with the SIM card can be made through the conductive terminals and the slots. Examples of the interfaces may include serial or parallel (for example, 6-pin or 8-pin) connections. In addition, a plurality of SIM card sizes (for example, a full-sized SIM, a mini SIM, or a micro-SIM) may be provided. In another embodiment, when a plurality of types of subscriptions are associated with a universal identity module (for example, a universal SIM), the mobile phone 400 may not include a plurality of SIM card interfaces. The managing device 450 is configured to manage the SIM card 1 and the SIM card 2. As shown in FIG. 4, the mobile phone 400 may further include a speaker 441 and a microphone 442 that are coupled to the codec (CODEC) 440. FIG. 4 also indicates that the CODEC 440 may be coupled to the processor 410 and to the modem 480 that communicates with the transceiver 490. The transceiver 490 is connected to one or more antennas. FIG. 4 shows an example of only one antenna. In a specific embodiment, the transceiver 490 is connected to a plurality of antennas, and the modem 480 supports diversity, where one of the plurality of antennas is a primary antenna and the other antennas are secondary antennas. The transceiver 490 may be an RF circuit. The RF circuit may be configured to send and receive information. For example, after receiving downlink information of a base station, the RF circuit can send the received downlink information to the processor 410 for processing. The RF circuit can also send uplink data to the base station. Generally, the RF circuit includes but is not limited to devices such as an antenna, at least one amplifier, a transceiver, a coupler, a low noise amplifier, and a duplexer. In addition, the RF circuit may further communicate with a network and another mobile device through wireless communication. The wireless communication may use any communication standard or protocol, including but not limited to a global system for mobile communication, a general packet radio service, code division multiple access, wideband code division multiple access, long term evolution, an e-mail message, a short message service, and the like. In this embodiment of this application, the transceiver 490 shown in FIG. 4 may include two radio frequency Rx channels and one radio frequency Tx channel (the radio frequency Tx channel, the radio frequency Rx 1 channel, and the radio frequency Rx 2 channel shown in FIG. 4). The memory 460 may be configured to store a software program and data. The processor 410 runs the software program and the data stored in the memory 460 to perform various functions and data processing of the mobile phone 400. For example, as shown in FIG. 4, the memory 460 stores an instruction 461 and transmit priority information 462. The instruction 461 may be executed by the processor 410. For example, the instruction 461 may include an instruction that can be executed by the processor 410 to receive communication data associated with the SIM card 1 at a primary signal input side of the modem 480. The "communication data associated with the SIM card 1" may be routed to the primary signal input side (not shown in FIG. 4) of the modem 480 through a primary RF path, namely, Rx 1 in the transceiver 490. The instruction 461 includes an instruction that can be executed by the processor 410 to receive communication data associated with the SIM card 2 at a secondary signal input side of the modem 480. The "communication data associated with the SIM card 2" may be routed to the secondary signal input side (not shown in FIG. 4) of the modem 480 through a secondary RF path, namely, Rx 2 in the transceiver 490. The memory 460 may include a program storage area and a data storage area. The program storage area may store an operating system, an application program required by at least one function (such as a sound playing function or an image playing function), and the like. The data storage area may store data (such as audio data and a phone book) created based on use of the mobile phone 400. In addition, the memory 460 may include a high-speed random access memory, and may further include a nonvolatile memory, for example, at least one magnetic disk storage device, a flash memory device, or another volatile solid-state memory device. In the following embodiment, the memory 460 stores an operating system that supports running of the mobile phone 400, for example, an iOS® operating system developed by Apple, an Android® open-source operating system developed by Google LLC, or a Windows® operating system developed by Microsoft Corporation. The input device 470 (for example, a touchscreen) may be configured to receive entered numerical or character information, and generate signal inputs related to user settings and function control of the mobile phone 400. Specifically, the input device 470 may include a touch panel disposed on the front side of the mobile phone 400. The touch panel may collect a touch operation of a user on or near the touch panel (such as an operation performed by the user on or near the touch panel by using any proper object or accessory such as a finger or a stylus), and drive a corresponding connection apparatus based on a preset program. Optionally, the touch panel may include two parts: a touch detection apparatus and a touch controller. The touch detection apparatus detects a touch location of the user, detects a signal brought by a touch operation, and sends the signal to the touch controller. The touch controller receives touch information from the touch detection apparatus, converts the touch information into touch point coordinates, sends the touch point coordinates to the processor 410, and can receive and execute an instruction sent by the processor 410. In addition, the touch panel may be implemented in a plurality of types, such as a resistive type, a capacitive type, infrared, and a surface acoustic wave. A display 431 (namely, a display screen) may be configured to display information entered by the user or information provided for the user, and graphical user interfaces (graphical user interface, GUI) of various menus of the mobile phone 400. The display 431 may include a display panel disposed on the front side of the mobile phone 400. The display panel may be in a form of a liquid crystal display, an organic light-emitting diode, and the like. After detecting a touch operation performed on or near the touch panel, the touch panel transfers the touch operation to the processor 410 to determine a touch event, and then the processor 410 provides corresponding visual output on the display panel based on a type of the touch event. In FIG. 4, the touch panel and the display panel are used as two independent components to implement input and output functions of the mobile phone 400. However, in some embodiments, the touch panel and the display panel may be integrated to implement the input and output functions of the mobile phone 400. The touch panel and display panel that are integrated may be briefly referred to as a touch display screen. In some other embodiments, the touch panel may be further provided with a pressure sensing sensor. In this way, when the user performs a touch operation on the touch panel, the touch panel can further detect pressure of the touch operation, and then the mobile phone 400 can more accurately detect the touch operation. The mobile phone 400 may further include at least one type of sensor 443, such as a light sensor, a motion sensor, and another sensor. Specifically, the optical sensor may include an ambient light sensor and an optical proximity sensor. The ambient light sensor may adjust luminance of the display panel based on intensity of ambient light. The optical proximity sensor is disposed on the front side of the mobile phone 400. When the mobile phone 400 is moved to an ear, the mobile phone 400 switches off the display panel based on detection of the optical proximity sensor. This can further reduce power consumption of the mobile phone 400. As one type of motion sensor, an accelerometer sensor may detect values of accelerations in all directions (generally on three axes), may detect a value and a direction of gravity when the mobile phone 400 is stationary, and may be applied to recognizing a mobile phone posture (for example, screen orientation switching, a related game, or magnetometer posture calibration), a function related to vibration recognition (such as a pedometer or a knock), and the like. Other sensors such as a gyroscope, a barometer, a hygrometer, a thermometer, and an infrared sensor that may be further included in the mobile phone 400 are not described herein. The CODEC 440, the speaker 441, and the microphone 442 may provide an audio interface between the user and the mobile phone 400. The CODEC 440 may convert received audio data into an electrical signal and then transmit the electrical signal to the speaker 441, and the speaker 441 converts the electrical signal into an audio signal for outputting. In addition, the microphone 442 converts a collected audio signal into an electrical signal. The CODEC 440 receives the electrical signal and converts the electrical signal into audio data, and then outputs the audio data to the RF circuit, to send the audio data to another mobile phone, or outputs the audio data to the memory 460 for further processing. The processor 410 is a control center of the mobile phone 400, and connected to various parts of the entire mobile terminal through various interfaces and lines, and performs various functions and data processing of the mobile phone 400 by running or executing the software program stored in the memory 460 and invoking the data stored in the memory 460, to perform overall monitoring on the mobile phone. In some embodiments, the processor 410 may include one or more processing units. The processor 410 may be further integrated with an application processor and a modem processor. The application processor mainly processes an operating system, a user interface, an application, and the like. The modem processor mainly processes wireless communication. It can be understood that the modem processor may not be integrated into the processor 410. The mobile phone 400 may further include a Bluetooth module and a Wi-Fi module. The Bluetooth module is configured to exchange information with another device by using a short-distance communication protocol such as Bluetooth. For example, the mobile phone 400 may establish, by using the Bluetooth module, a Bluetooth connection with a wearable electronic device (for example, a smartwatch) that also has a Bluetooth module, to exchange data. Wi-Fi belongs to a short-range wireless transmission technology. The mobile phone 400 may help, by using the Wi-Fi module, the user receive and send an email, browse a web page, access streaming media, and the like. The Wi-Fi module provides wireless broadband internet access for the user. The mobile phone 400 further includes the power supply 491 (such as a battery) that supplies power to each component. The power supply may be logically connected to the processor 410 through a power management system, to implement functions such as charging, discharging, and power consumption management through the power management system. It may be understood that, in the following embodiments, the power supply 491 may be configured to supply power to the display panel and the touch panel. All methods in the following embodiments may be implemented in the mobile phone 400 having the foregoing hardware structure.

The mobile phone 400 is used as an example to describe an application scenario to which the communication method provided in the embodiments of this application is applicable.

When the mobile phone 400 is used, there may be a case in which at a moment or within a determined time period, uplink data 1 needs to be sent to a network side device 1 by using the SIM card 1, and uplink data 2 needs to be sent to a network side device 2 by using the SIM card 2 simultaneously. A scenario in which the SIM card 1 in the mobile phone 400 performs voice communication and the SIM card 2 is in a standby state is used as an example. When the SIM card 1 is in a call state, the mobile phone 400 transmits the uplink data 1 of the SIM card 1 on the radio frequency Tx channel, and at the same time, the mobile phone 400 receives a voice paging (paging) request for the SIM card 2, and responds to the voice paging request. In this scenario, the mobile phone 400 needs to transmit the uplink data 2 of the SIM card 2 on the radio frequency Tx channel, which causes a resource conflict.

For example, the uplink data 1 of the SIM card 1 transmitted on the radio frequency Tx channel in the mobile phone 400 may include a signaling packet, a voice packet, a scheduling request (scheduling request, SR) packet, an acknowledgment (acknowledgment, ACK) packet, a negative acknowledgment (negative acknowledgment, NACK) packet, an empty packet, a channel quality indicator (channel quality indicator, CQI) packet, channel state information (channel state information, CSI), a sounding reference signal (sounding reference signal, SRS) packet, a service data packet, and the like of the SIM card 1. Other examples are not enumerated one by one in this embodiment of this application. For example, the signaling packet of the SIM card 1 may be a data packet that is to be sent by the SIM card 1 to the network side device 1 in voice communication and that is used to support carrying of protocol signaling in the voice communication. The voice packet of the SIM card 1 is a data packet that carries voice data and that is sent by the terminal to the network side device 1 when the SIM card 1 is in the call state. The ACK packet of the SIM card 1 is a data packet that carries an acknowledgment message and that the terminal returns to the network side device 1 after receiving signaling sent by the network side device 1. For example, the ACK packet of the SIM card 1 is a HARQ-ACK packet. The NACK packet of the SIM card 1 is a data packet that carries a negative acknowledgment message and that the terminal returns to the network side device 1 after receiving signaling sent by the network side device 1. For example, the NACK packet of the SIM card 1 is a HARQ-NACK packet. The service data packet of the SIM card 1 is an Internet access data service packet of the SIM card 1. For example, the service data packet of the SIM card 1 may be a video streaming media data packet downloaded by using data traffic of the SIM card 1 when the user uses the terminal to watch a video.

When the SIM card 1 in the mobile phone 400 is in the call state, and the mobile phone 400 receives the voice paging (paging) request for the SIM card 2, and responds to the voice paging request, the uplink data 2 transmitted on the radio frequency Tx channel in the mobile phone 400 may include: a signaling packet, an ACK packet, a NACK packet, an empty packet, a pure CQI packet, an SCI packet, an SRS packet, and the like of the SIM card 2. For example, the signaling packet of the SIM card 2 may include a data packet that carries protocol signaling and that is sent by the terminal to the network side device 2 in response to the paging request for the SIM card 2. Alternatively, if the SIM card 2 establishes an RRC connection with the network side device 2, RRC signaling or the signaling packet of the SIM card 2 sent to the network side device 2 may be SIP signaling sent to the network side device 2 after the SIM card 2 establishes the RRC connection with the network side device 2. The ACK packet of the SIM card 2 is, for example, a HARQ-ACK packet, and the NACK packet of the SIM card 2 is, for example, a HARQ-NACK packet. The paging request for the SIM card 2 may be a paging request for voice, or may be a paging request for another service. For example, the paging request for the SIM card 2 may be a paging request for a service.

The foregoing description is provided by using a scenario in which the SIM card 1 in the mobile phone 400 performs voice communication and the SIM card 2 is in the standby state as an example. In another scenario, there may also be the case in which the uplink data 1 of the SIM card 1 and the uplink data 2 of the SIM card 2 need to be sent on the radio frequency Tx channel simultaneously. Other examples are not described herein again. It should be noted that the communication method provided in this embodiment of this application is applicable to any scenario in which uplink data of the SIM card 1 and the SIM card 2 cannot be simultaneously transmitted because there is only one single radio frequency Tx channel in the terminal supporting DR-DSDS.

Figure 5:
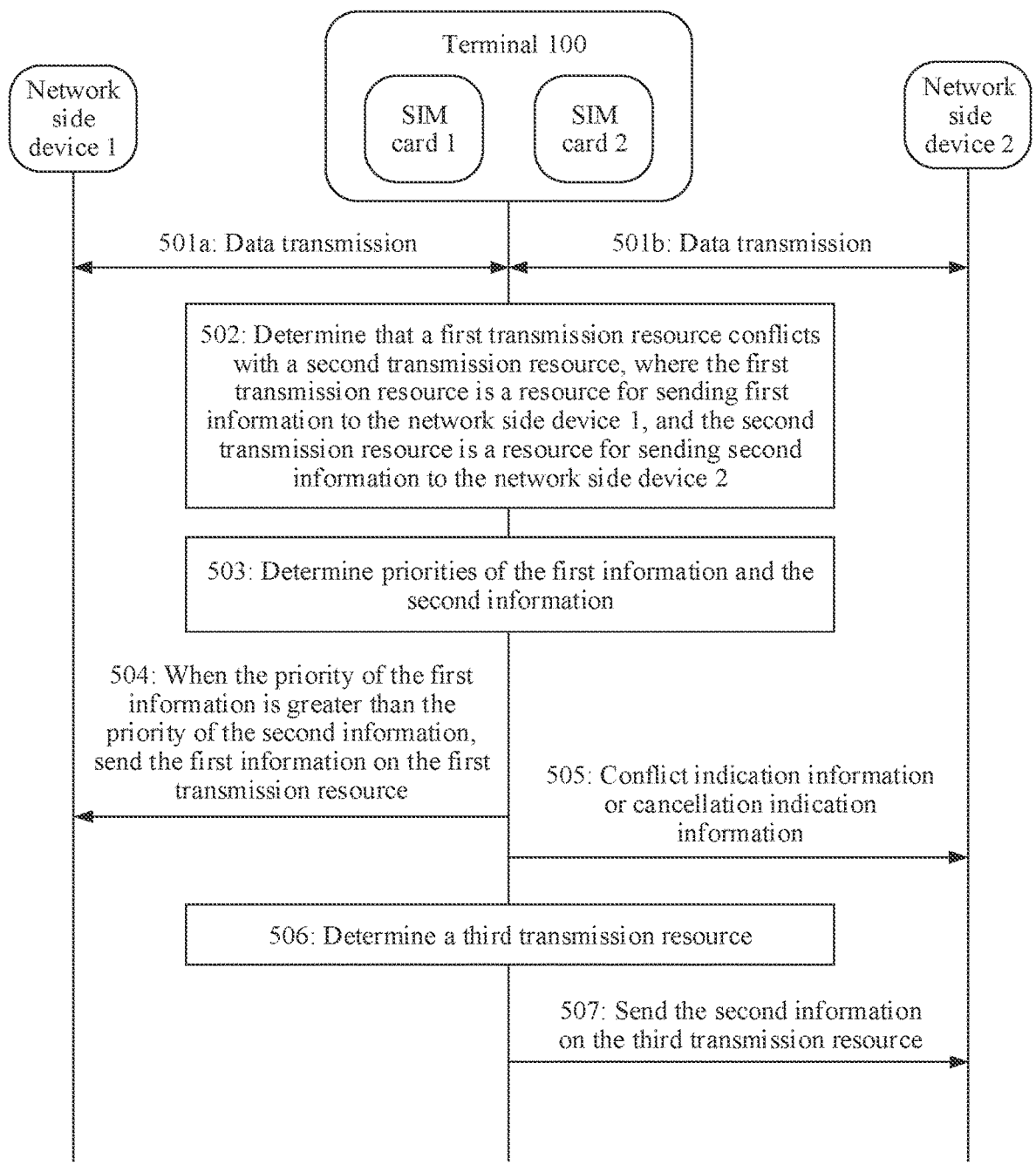
FIG. 5 is a schematic flowchart of a communication method according to an embodiment of this application.

For example, an application scenario shown in FIG. 2 is used as an example in the following embodiments to describe in detail the communication method provided in the embodiments of this application. The method may be performed by a terminal that supports DR-DSDS. FIG. 5 is a flowchart of a communication method according to an embodiment of this application.

S501a: A terminal 100 communicates with a network side device 1 by using a SIM card 1.

S501b: The terminal 100 communicates with a network side device 2 by using a SIM card 2.

The terminal 100 may communicate with the network side device 1 by using the SIM card 1. The network side device 1 is a network side device corresponding to the SIM card 1. The terminal 100 may communicate with the network side device 2 by using the SIM card 2. The network side device 2 is a network side device corresponding to the SIM card 2. It should be noted that the SIM card 1 and the SIM card 2 may belong to a same network carrier, or may belong to different network carriers. The network carriers include carriers such as China Mobile, China Unicom, and China Telecom.

Because the terminal 100 is configured with only one single radio frequency Tx channel, the terminal 100 may perform data transmission with the network side device 1 (for example, a gNB 1) and the network side device 2 (for example, a gNB 2) through the single Tx channel in a time division multiplexing manner.

S502: The terminal 100 determines that a first transmission resource conflicts with a second transmission resource, where the first transmission resource is a resource used by the terminal 100 to send first information to the network side device 1, and the second transmission resource is a resource used by the terminal 100 to send second information to the network side device 2.

It may be understood that the first transmission resource of the first information and the second transmission resource of the second information may be preconfigured, or may be configured by the network side devices. In an example, the first transmission resource corresponding to the first information may be preconfigured in the first SIM card, and the second transmission resource corresponding to the second information may be preconfigured in the second SIM card. Therefore, after being installed with the first SIM card and the second SIM card, the terminal 100 may read configuration information of the first transmission resource in the first SIM card and configuration information of the second transmission resource in the second SIM card. For another example, the network side device 1 corresponding to the first SIM card may send first configuration information to the terminal 100, where the first configuration information indicates the first transmission resource corresponding to the first information. The network side device 2 corresponding to the second SIM card may send second configuration information to the terminal 100, where the second configuration information indicates the second transmission resource corresponding to the second information. The terminal 100 may determine the first transmission resource by parsing the received first configuration information, and determine the second transmission resource by parsing the received second configuration information.

It should be noted that, in a process of communicating with the network side device 1 and the network side device 2, the terminal 100 may separately trigger sending of uplink data to the network side device 1 and the network side device 2. For example, at a moment or within a determined time period, the terminal 100 needs to send uplink data 1 to the network side device 1, and send uplink data 2 to the network side device 2. However, because the only one radio frequency transmission Tx channel is configured in the terminal 100, uplink data can be sent to only one network side device on one moment. Therefore, when determining that the first transmission resource conflicts with the second transmission resource, the terminal 100 may adopt a conflict resolution measure. A specific conflict resolution measure is described in the following.

It may be understood that a conflict between the first transmission resource and the second transmission resource may include: a conflict between the first transmission resource and the second transmission resource in time domain, and/or a conflict between the first transmission resource and the second transmission resource in frequency domain. The conflict in time domain may include overlapping of at least one subframe (Subframe)/slot (Slot)/symbol (symbol) of the first transmission resource and the second transmission resource. The conflict in frequency domain may include overlapping of at least one subcarrier/channel of the first transmission resource and the second transmission resource.

S503: The terminal 100 compares a priority of the first information with a priority of the second information.

Specifically, the terminal 100 may determine the priorities of the first information and the second information according to at least one of the following policies.

Policy 1

The terminal 100 may determine the priorities of the first information and the second information based on a first sending periodicity of the first information and a second sending periodicity of the second information. For example, if the terminal 100 determines that the first sending periodicity of the first information is greater than the second sending periodicity of the second information, it indicates that a frequency of sending the second information to a second network side device is higher, and a frequency of sending the first information to a first network side device is lower. Therefore, the priority of the first information is higher than the priority of the second information. In other words, the terminal 100 may preferentially send the first information, and cancel or delay sending the second information. For example, the terminal 100 may send the second information to the second network side device in a next sending periodicity of the second information. For another example, if the terminal 100 determines that the first sending periodicity of the first information is smaller than the second sending periodicity of the second information, it indicates that a frequency of sending the first information to a first network side device is higher, and a frequency of sending the second information to a second network side device is lower. Therefore, the priority of the second information is higher than the priority of the first information. In other words, the terminal 100 may preferentially send the second information, and cancel or delay sending the first information. For example, the terminal 100 may send the first information to the first network side device in a next sending periodicity of the first information.

The first sending periodicity of the first information may be preconfigured, or may be indicated by the first network side device. The second sending period of the second information may be preconfigured, or indicated by the second network side device. This is not limited in this embodiment of this application.

Policy 2

If the terminal 100 determines that the first information is aperiodically triggered and the second information is periodically triggered, the priority of the first information is higher than the priority of the second information. If the terminal 100 determines that the second information is aperiodically triggered and the first information is periodically triggered, the priority of the second information is higher than the priority of the first information.

For example, if the first information is aperiodically triggered, the terminal 100 does not determine a next sending occasion of the first information. Therefore, if the first information is not sent this time, the next sending occasion of the first information cannot be predicted. If the second information is periodically triggered, the terminal 100 may determine a next sending occasion of the second information. In this case, the terminal 100 may preferentially send the first information, and delay or cancel sending the second information. For example, the terminal 100 may send the second information to the second network side device in a next sending periodicity of the second information.

Policy 3: The terminal 100 determines the priorities of the second information and the first information based on a next sending occasion/moment of the first information and a next sending occasion/moment of the second information. If the next sending occasion/moment of the first information is later than the next sending occasion/moment of the second information, the priority of the first information is higher than the priority of the second information. If the next sending occasion/moment of the second information is later than the next sending occasion/moment of the first information, the priority of the second information is higher than the priority of the first information.

Optionally, the next sending occasion/moment of the first information may be preconfigured or indicated by the network side device 1, and the next sending occasion/moment of the second information may be preconfigured or indicated by the network side device 2. This is not limited in this embodiment of this application. Certainly, if the first information is periodically triggered, when a sending periodicity of the first information is determined, the next sending occasion/moment of the first information may be determined based on the sending periodicity. If the second information is also periodically triggered, the next sending occasion/moment of the second information may also be determined based on the sending periodicity of the second information.

Policy 4: The terminal 100 may determine the priorities of the first information and the second information based on a first type of the first information and a second type of the second information.

In a possible case, a type of the first information and a type of the second information are the same. In this case, the terminal 100 may determine the priorities of the first information and the second information according to any one or more of the policy 1, the policy 2, or the policy 3. That a type of the first information and a type of the second information are the same may include: Both the first information and the second information are control information, or both the first information and the second information are data information. For another example, when both the first information and the second information are control information, both the two may be SR information, CSI information, HARQ feedback information, CSI feedback information, or the like. This is not limited in this embodiment of this application.

Optionally, if both the first information and the second information are control information, the first transmission resource for transmitting the first information may be an uplink control channel PUCCH or an uplink shared channel PUSCH, and the second transmission resource for transmitting the second information may be an uplink control channel PUCCH or an uplink shared channel PUSCH.

In another possible case, the type of the first information and the type of the second information are different. In this case, the terminal 100 may also determine the priorities of the first information and the second information according to any one or more of the policy 1, the policy 2, or the policy 3 mentioned above. That the type of the first information and the type of the second information are different may include: the first information is data information, and the second information is control information, or the first information is control information, and the second information is data information; or the first information and the second information are different types of control information, for example, the first information is first control information, the second information is second control information, and the first control information and the second control information are different. For example, the first control information includes at least one of the following information: an SR, CSI, CSI feedback, or HARQ feedback, and the second control information includes at least one of the following information: an SR, CSI, HARQ feedback, CSI feedback, or HARQ feedback.

For example, the first information and the second information are different types of control information. In addition to the foregoing policy 1 to policy 3, another policy may be used. For example, a priority relationship between different types of control information may be agreed in advance. For example, a HARQ feedback priority>an SR sending priority>a CSI feedback priority. Alternatively, a HARQ-ACK feedback priority>a HARQ-NACK feedback priority>an SR sending priority>a CSI feedback priority. Therefore, when the first control information is SR feedback information, and the second control information is CSI feedback information, the terminal 100 preferentially sends the first control information to the first network side device, and cancels or delays sending the second control information to the second network side device.

For another example, when the first control information is HARQ-ACK feedback information, and the second control information is HARQ-NACK feedback information, the terminal 100 may preferentially send the HARQ-ACK feedback information to the first network side device, and cancel or delay sending the HARQ-NACK feedback information to the second network side device. In this case, because the HARQ-ACK feedback information is preferentially fed back to the first network side device, the first network side device does not need to schedule unnecessary retransmission resources for the terminal 100.

For example, the first information is control information, and the second information is data information. In addition to the policy 1 to the policy 3, another policy, for example, at least one of the following policies, may be used.

Policy 5: A priority of the control information is higher than a priority of the data information by default. Therefore, when the first information is the control information, and the second information is the data information, the terminal 100 preferentially sends the first information to the first network side device, and cancels or delays sending the second information to the second network side device. In the policy, a priority relationship between the control information and the data information may be preconfigured.

Policy 6: The terminal 100 determines, based on configuration of a network side device (the network side device 1 or the network side device 2), whether to preferentially send the first information or the second information when there is a conflict.

For example, the network side device 1 or the network side device 2 may send indication information to the terminal 100 in advance, where the indication information is used to indicate the terminal 100 to preferentially send control information when a transmission resource of data information conflicts with a transmission resource of the control information, or to preferentially send data information when a transmission resource of the data information conflicts with a transmission resource of control information. For example, "the network side device 1 or the network side device 2 sends indication information to the terminal 100 in advance" may be that the network side device 1 or the network side device 2 sends the indication information to the terminal 100 during or after establishing a connection with the terminal 100. For example, the network side device 1 or the network side device 2 may send the indication information to the terminal 100 before S501*a* and/or S501*b* in the embodiment shown in FIG. 5 are or is performed.

Policy 7: The terminal 100 may determine the priorities of the second information and the first information based on a service feature of the second information. For example, if the service feature of the second information, namely, the data information, is a low-latency service, the terminal 100 may preferentially send the second information, and cancel or delay sending the first information.

Optionally, the terminal 100 may determine a priority relationship of the first information and the second information based on the service feature of the second information; or the terminal 100 may send the service feature of the second information to the network side device 1, and the network side device 1 determines the priority relationship between the first information and the second information. For example, the terminal 100 reports the service feature of the second information to the network side device 1. If the network side device 1 determines that the service feature of the second information is a low-latency service, the network side device 1 sends indication information to the terminal 100, where the indication information indicates that the priority of the second information is higher than the priority of the first information. It may be understood that the service feature of the second information may be carried in conflict indication information, in cancellation indication information, or in other indication information independent of the conflict indication information and the cancellation indication information. This is not limited in this embodiment of this application.

For example, both the first information and the second information are data information. In addition to the foregoing policy 1 to policy 3, another policy may be used. For example, the terminal 100 may determine the priorities of the first information and the second information based on service features of the first information and the second information. For example, if the first information is voice over LTE (voice over LTE, VoLTE) data corresponding to the first SIM card, and the second information is non-voice communication service data corresponding to the second SIM card, the terminal 100 determines that the priority of the first information is higher than the priority of the second information.

The foregoing embodiments describe several possible implementations in which the terminal 100 determines the priorities of the first information and the second information. During actual application, another manner may be used to determine the priorities of the first information and the second information. Examples are not enumerated one by one in this embodiment of this application.

S504: When the priority of the first information is higher than the priority of the second information, the terminal 100 sends the first information on the first transmission resource.

For example, if the terminal 100 determines that the priority of the first information is higher than the priority of the second information, the terminal 100 sends the first information on the first transmission resource.

S505: The terminal 100 sends first indication information and/or second indication information to the second network side device. The first indication information may be conflict indication information. The second indication information may be cancellation indication information. The conflict indication information indicates that the first transmission resource conflicts with the second transmission resource. The cancellation indication information indicates that sending the second information on the second transmission resource is canceled.

The following embodiment describes the conflict indication information and the cancellation indication information.

Optionally, the conflict indication information may indicate that the first transmission resource conflicts with the second transmission resource. The cancellation indication information may indicate that the terminal cancels sending the second information on the second transmission resource.

Optionally, the conflict indication information or the cancellation indication information may further indicate a reason for a conflict. For example, a data transmission conflict occurs because the terminal is configured with only one single Tx channel. Certainly, the reason for the conflict may alternatively be carried in other indication information independent of the conflict indication information and the cancellation indication information. This is not limited in this embodiment of this application.

Optionally, the conflict indication information or the cancellation indication information may further indicate a conflicted resource, for example, an overlapped resource of the first transmission resource and the second transmission resource. The overlapped resource is, for example, overlapped time information and/or frequency domain information. The overlapped time information may include a quantity of slots or numbers of slots that overlap, a quantity of symbols or numbers of symbols that overlap, or the like. Certainly, the conflicted resource may alternatively be carried in other indication information independent of the conflict indication information and the cancellation indication information. This is not limited in this embodiment of this application.

Optionally, the conflict indication information or the cancellation indication information may further indicate a configuration type of the second information, for example, periodic configuration or aperiodic configuration. After receiving the conflict indication information or the cancellation indication information, the second network side device may determine, based on the configuration type of the second information, whether to reconfigure a new transmission resource for the second information. For example, if the second information is periodically sent, the second network side device does not need to reconfigure the new transmission resource for the second information. This is because the second information may still occur in a next periodicity. If the second information is aperiodically sent, the second network side device may reconfigure the new transmission resource for the second information. Because if the second information is aperiodically triggered, the next sending occasion of the second information cannot be determined. Therefore, the new transmission resource may be reconfigured for the second information. Certainly, the configuration type of the second information may alternatively be carried in other indication information independent of the conflict indication information and the cancellation indication information. This is not limited in this embodiment of this application.

S506. Determine a third transmission resource. The third transmission resource may be a resource before or after the second transmission resource.

That the third transmission resource is a resource before or after the second transmission resource may mean that the first transmission resource is located before or after the second transmission resource in time domain.

Optionally, the terminal 100 may determine the third transmission resource in a plurality of manners.

Manner 1: The terminal 100 determines the third transmission resource based on the first transmission resource and the second transmission resource. In other words, when the first transmission resource conflicts with the second transmission resource, the terminal 100 itself may configure the third transmission resource. For example, when the priority of the first information is higher than the priority of the second information, the terminal 100 sends the first information on the first transmission resource, and sends the second information on the third transmission resource. The third transmission resource is the resource before or after the second transmission resource. For another example, when the priority of the first information is lower than the priority of the second information, the terminal 100 sends the second information on the second transmission resource, and sends the first information on the third transmission resource. The third transmission resource is the resource before or after the first transmission resource.

The terminal 100 may determine the third transmission resource based on the first transmission resource and the second transmission resource in a plurality of manners. For example, if the terminal 100 determines that the priority of the first information is higher than the priority of the second information, the terminal 100 determines the third transmission resource provided that the third transmission resource does not conflict with the first transmission resource. For another example, when the second transmission resource is periodically sent, the third transmission resource may be a resource of a previous periodicity of the second transmission resource, or the third transmission resource may be a resource of a next periodicity of the second transmission resource.

Optionally, after determining the third transmission resource by itself, the terminal 100 may send configuration information of the third transmission resource to the network side device 2. For example, the terminal 100 may send the configuration information of the third transmission resource to the network side device 2 before 507 is performed, to indicate the network side device 2 to receive the second information on the third transmission resource. For example, after receiving the configuration information of the third transmission resource sent by the terminal 100, the network side device 2 may feed back response information to the terminal 100. For example, the network side device 2 may feed back the response information to the terminal 100 before 507. The response information may indicate that the network side device 2 agrees or does not agree that the terminal 100 uses the third transmission resource to transmit the second information. If the network side device 2 agrees, the terminal 100 transmits the second information on the third transmission resource. If the network side device 2 does not agree, the network side device 2 may re-determine a fourth transmission resource, and then deliver configuration information of the fourth transmission resource to the terminal 100, so that the terminal 100 transmits the second information on the fourth transmission resource.

Optionally, the configuration information of the third transmission resource may be carried in the conflict indication information, in the cancellation indication information, or in other indication information independent of the conflict indication information and the cancellation indication information. This is not limited in this embodiment of this application.

Manner 2. The network side device 2 configures the third transmission resource for transmitting the second information for the terminal 100. For example, if the priority of the first information is higher than the priority of the second information, the terminal 100 may send configuration information of the first transmission resource or configuration information of the overlapped resource of the first transmission resource and the second transmission resource to the network side device 2. In this case, the network side device 2 may configure the third transmission resource, and send configuration information of the third transmission resource to the terminal 100, so that the terminal 100 sends the second information on the third transmission resource.

Optionally, the configuration information of the first transmission resource, or the configuration information of the overlapped resource of the first transmission resource and the second transmission resource may be carried in the conflict indication information, in the cancellation indication information, or in other indication information independent of the conflict indication information and the cancellation indication information. This is not limited in this embodiment of this application.

S507: The terminal 100 sends the second information on the third transmission resource.

It should be noted that, in the embodiment shown in FIG. 5, because the terminal 100 with one single Tx channel cannot simultaneously send the first information to the network side device 1 and send the second information to the network side device 2, the terminal 100 with one single Tx channel may determine, based on the priority relationship between the first information and the second information, information to be preferentially sent. If the first information is preferentially sent, the terminal 100 may re-determine the third transmission resource for transmitting the second information, and send the second information on the third transmission resource. In this manner, the resource conflict that occurs because there is the only one single Tx path is resolved.

Figure 6:
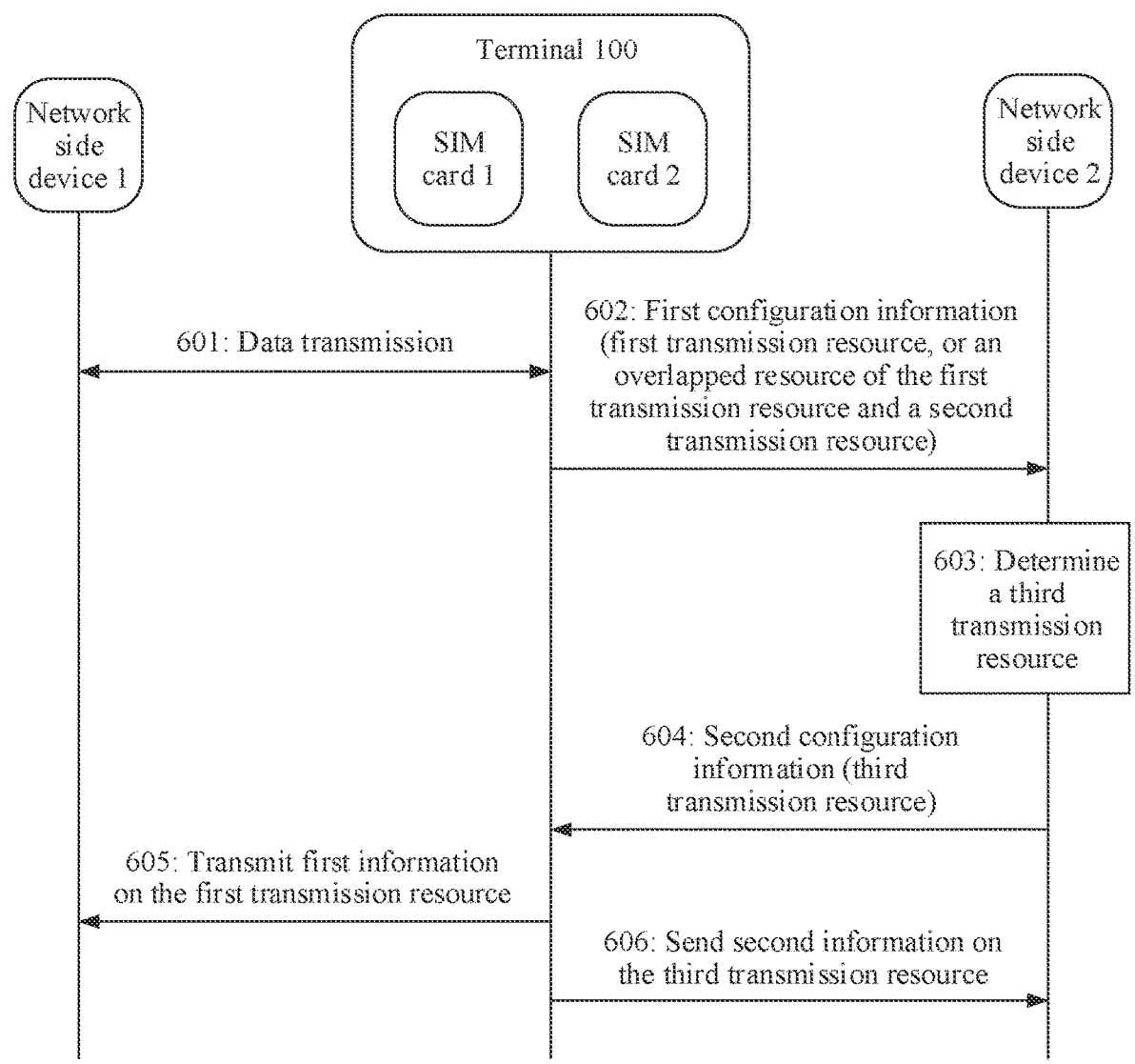
FIG. 6 is a schematic flowchart of another communication method according to an embodiment of this application.

FIG. 6 is a schematic flowchart of a communication method according to another embodiment of this application. The method is applicable to the application scenario shown in FIG. 2. As shown in FIG. 6, a procedure of the communication method may include the following steps.

601: A terminal 100 communicates with a network side device 1 by using a SIM card 1.

602: The terminal 100 sends first configuration information to a network side device 2. The first configuration information indicates a first transmission resource, or indicates an overlapped resource of the first transmission resource and a second transmission resource. The first transmission resource is a resource used by the terminal 100 to send first information to the network side device 1. The second transmission resource is a resource used by the terminal 100 to send second information to the network side device 2.

Optionally, the terminal 100 may send the first configuration information to the network side device 2 during or after establishing a connection with the network side device 2. For example, the first configuration information may be carried in an RRC connection request (RRC Connection Request) message or in an RRC connection setup complete (RRC Connection Setup Complete) message.

Optionally, the terminal 100 may further send the first configuration information to the network side device 2 when determining that the first transmission resource conflicts with the second transmission resource. For example, the first transmission resource may be preconfigured in a first SIM card, and the second transmission resource may be preconfigured in a second SIM card. Therefore, the terminal 100 reads the first configuration information of the first transmission resource from the first SIM card, and reads second configuration information of the second transmission resource from the second SIM card. When determining that the first transmission resource conflicts with the second transmission resource, the terminal 100 sends the first configuration information to the network side device 2.

For example, the first information is first control information, and the second information is second control information. Alternatively, the first information is control information, and the second information is data information. Alternatively, the first information is data information, and the second information is control information. Alternatively, both the first information and the second information are data information. The first control information includes at least one of the following information: an uplink scheduling request SR, channel state information CSI, hybrid automatic repeat request HARQ feedback information, or CSI feedback information. The second control information includes at least one of the following information: an SR, CSI, HARQ feedback information, or CSI feedback information. Optionally, the first information is HARQ-ACK, and the second information is HARQ-NACK.

603: The network side device 2 determines a third transmission resource based on the first configuration information. The third transmission resource is a resource used by the terminal 100 to send the second information to the network side device 2.

Optionally, after receiving the first configuration information reported by the terminal 100, the network side device 2 may determine second configuration information of the third transmission resource, so that the third transmission resource does not conflict with the first transmission resource.

604: The terminal 100 receives the second configuration information sent by the network side device 2. The second configuration information indicates the third transmission resource.

605: The terminal 100 sends the first information on the first transmission resource.

606: The terminal 100 sends the second information on the third transmission resource.

Optionally, 603 may not be performed. For example, before 603 is performed, the terminal 100 may send a configuration type of the second information to the network side device 2, where the configuration type includes whether the second information is periodically or aperiodically sent. The network side device 2 determines, based on the configuration type, whether the third transmission resource needs to be configured for the second information. If the second information is periodically sent, the network side device 2 does not need to configure the third transmission resource, because the second information can be sent in a next periodicity. If the second information is aperiodically sent, the network side device 2 may configure the third transmission resource.

The foregoing describes the communication method provided in the embodiments of this application, and the following describes the communication apparatus provided in the embodiments of this application.

Figure 7:
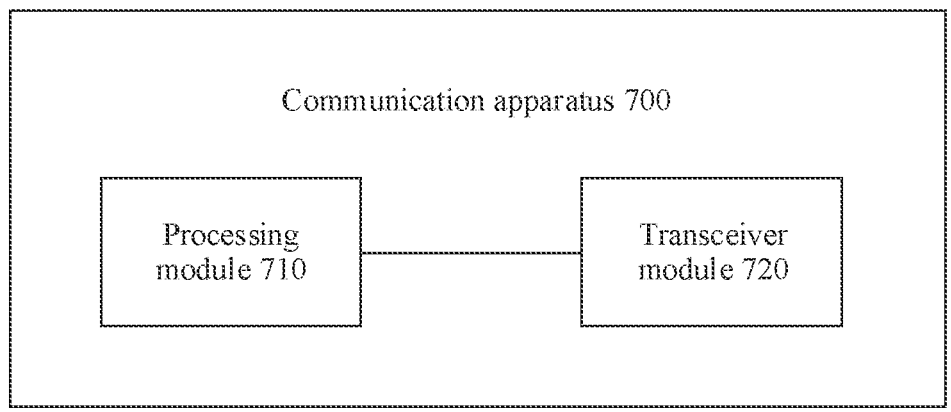
FIG. 7 is a schematic diagram 1 of a structure of a communication apparatus according to an embodiment of this application.

FIG. 7 is a schematic block diagram of a communication apparatus 700 according to an embodiment of this application. The communication apparatus 700 may be the terminal 100 described above. As shown in FIG. 7, the communication apparatus 700 includes:

a processing module 710, configured to determine that a first transmission resource conflicts with a second transmission resource, where the first transmission resource is a resource used by the communication apparatus to send first information to a first network side, the first network side device corresponds to a first user identity supported by the communication apparatus, the second transmission resource is a resource used by the communication apparatus to send second information to a second network side device, and the second network side device corresponds to a second user identity supported by the communication apparatus; and a transceiver module 720, configured to send the first information on the first transmission resource, where the processing module 710 is further configured to cancel sending the second information on the second transmission resource, or the transceiver module 720 is further configured to send the second information on a third transmission resource, where the third transmission resource is a resource before or after the second transmission resource.

Optionally, in an embodiment, the transceiver module 720 is further configured to send first indication information to the second network side device. The first indication information indicates that the first transmission resource of the terminal conflicts with the second transmission resource.

Optionally, in an embodiment, the transceiver module 720 is further configured to send second indication information to the second network side device. The second indication information indicates that the terminal cancels sending the second information on the second transmission resource.

Optionally, in an embodiment, the first indication information includes information about an overlapped resource of the first transmission resource and the second transmission resource, and/or a configuration type of the second information. Alternatively, the second indication information includes information about an overlapped resource of the first transmission resource and the second transmission resource, and/or a configuration type of the second information.

Optionally, in an embodiment, the second indication information carries cancellation reason indication information. The cancellation reason indication information indicates the transmission conflict between the second information and the first information on the single transmission Tx link of the terminal.

Optionally, in an embodiment, the processing module 710 is further configured to:

determine that a sending periodicity of the first information is greater than a sending periodicity of the second information; and/or determine that a next sending occasion/moment of the first information is later than a next sending occasion/moment of the second information; and/or determine, based on a type of the first information and a type of the second information, that a priority of the first information is higher than a priority of the second information; and/or determine that the first information is aperiodically triggered, and the second information is periodically triggered.

Optionally, in an embodiment, the first information is first control information, and the second information is second control information.

Optionally, in an embodiment, the first control information includes at least one of the following information: an uplink scheduling request SR, channel state information CSI, hybrid automatic repeat request HARQ feedback information, or CSI feedback information.

The second control information includes at least one of the following information:

an SR, CSI, HARQ feedback information, or CSI feedback information.

Optionally, in an embodiment, the first information is HARQ-ACK, and the second information is HARQ-NACK.

Optionally, in an embodiment, the first information is control information, and the second information is data information. Alternatively, the first information is data information, and the second information is control information.

It should be understood that the processing module 710 in this embodiment of this application may be implemented by a processor or a processor-related circuit component. Optionally, the transceiver module 720 may include a receiving module and a sending module. For example, the transceiver module 720 may be implemented by a transceiver or a transceiver-related circuit component.

Figure 8:
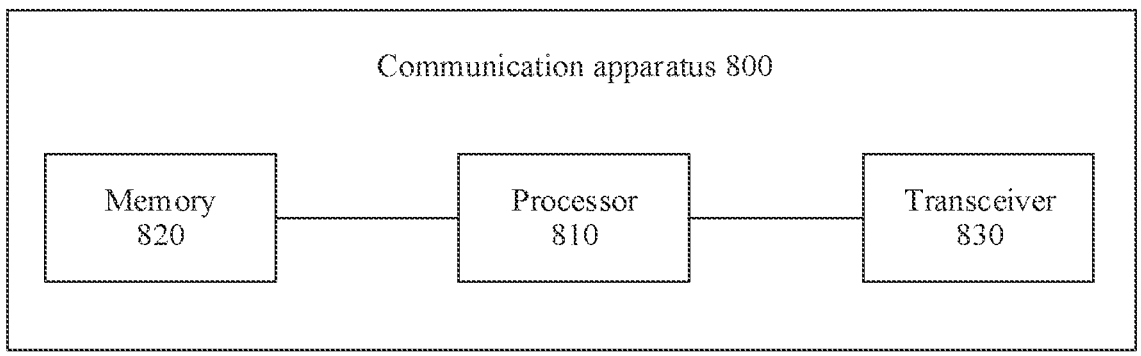
FIG. 8 is a schematic diagram 2 of a structure of a communication apparatus according to an embodiment of this application.

As shown in FIG. 8, an embodiment of this application further provides a communication apparatus 800. The communication apparatus 800 may be the terminal 100 described above. The communication apparatus 800 includes a processor 810, a memory 820, and a transceiver 830. The memory 820 stores instructions or a program. The processor 810 is configured to execute the instructions or the program stored in the memory 820. When the instructions or the program stored in the memory 820 are or is executed, the processor 810 is configured to perform an operation performed by the processing module 710 in the foregoing embodiment, and the transceiver 830 is configured to perform an operation performed by the transceiver module 720 in the foregoing embodiment.

It should be understood that the communication apparatus 700 or the communication apparatus 800 according to the embodiments of this application may be corresponding to the terminal 100 in the communication methods shown in FIG. 5 and FIG. 6 in the embodiments of this application. In addition, operations and/or functions of modules in the communication apparatus 700 or the communication apparatus 800 are used to implement corresponding procedures of the methods of the terminal 100 in FIG. 5 and FIG. 6. For brevity, details are not described herein again.

Figure 9:
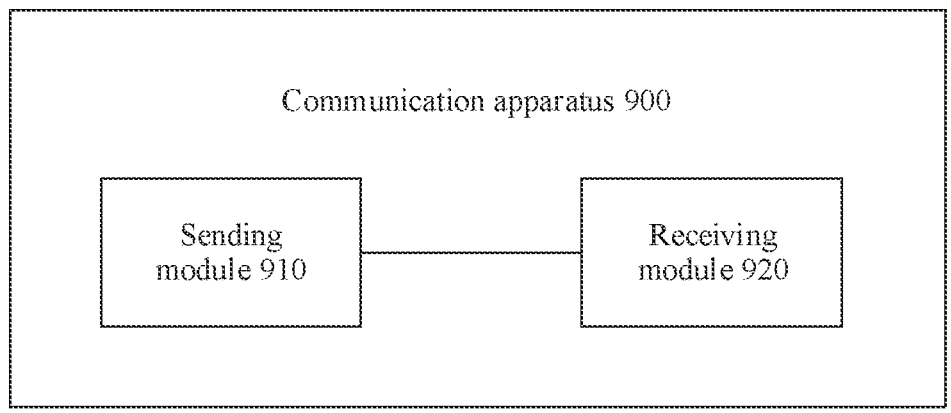
FIG. 9 is a schematic diagram 3 of a structure of a communication apparatus according to an embodiment of this application.

FIG. 9 is a schematic block diagram of a communication apparatus 900 according to an embodiment of this application. The communication apparatus 900 may be the terminal 100 described above. The communication apparatus 900 includes:

a sending module 910, configured to send first configuration information to a second network side device, where the first configuration information indicates a first transmission resource, indicates an overlapped resource of a first transmission resource and a second transmission resource, or indicates a third transmission resource, the first transmission resource is a resource used by a terminal to send first information to a first network side, the second transmission resource is a resource used by the terminal to send second information to the second network side device, and the third transmission resource is a resource determined by the terminal based on the first transmission resource and the second transmission resource; and a receiving module 920, configured to receive first response information that is sent by the second network side device and that is based on the first configuration information, where the first response information indicates a fourth transmission resource that is reconfigured by the second network side device for the terminal and that is used to transmit the second information, or the first response information indicates that the second network side device allows the terminal to transmit the second information on the third transmission resource, where the first network side device corresponds to a first user identity supported by the terminal, and the second network side device corresponds to a second user identity supported by the terminal.

Optionally, the communication apparatus 900 may further include a processing module, which is not shown in the figure.

Optionally, in an embodiment, the sending module 910 is specifically configured to:

send the first configuration information to the second network side device during or after establishing a connection with the second network side device; or send the first configuration information to the second network side device when the processing module determines that a conflict exists between data transmission on the first transmission resource and the second transmission resource.

Optionally, in an embodiment, the first information is first control information, and the second information is second control information. Alternatively, the first information is control information, and the second information is data information. Alternatively, the first information is data information, and the second information is control information. Alternatively, both the first information and the second information are data information.

It should be understood that the sending module 910 and the receiving module 920 in this embodiment of this application may be implemented by a transceiver or a transceiver-related circuit component.

Figure 10:
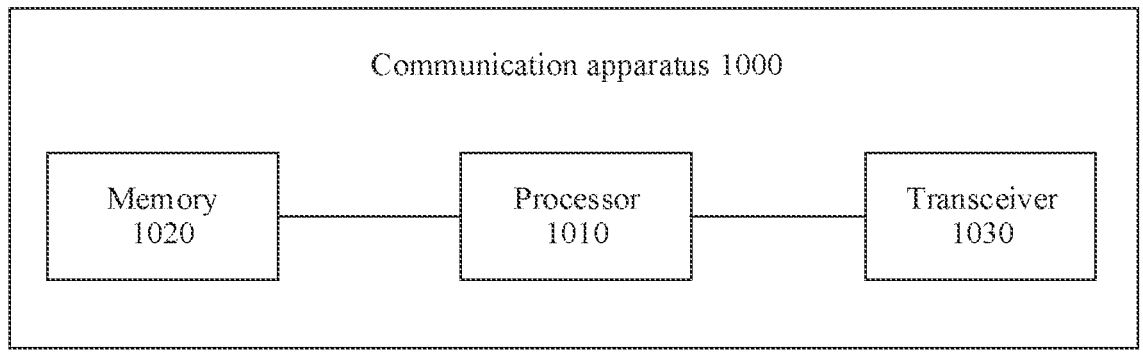
FIG. 10 is a schematic diagram 4 of a structure of a communication apparatus according to an embodiment of this application.

As shown in FIG. 10, an embodiment of this application further provides a communication apparatus 1000. The communication apparatus 1000 may be the terminal 100 described above. The communication apparatus 1000 includes a processor 1010, a memory 1020, and a transceiver 1030. The memory 1020 stores instructions or a program. The processor 1010 is configured to execute the instructions or the program stored in the memory 1020. When the instructions or the program stored in the memory 1020 are or is executed, the processor 1010 controls the transceiver 1030 to perform operations performed by the sending module 910 and the receiving module 920 in the foregoing embodiment.

It should be understood that the communication apparatus 900 or the communication apparatus 1000 according to the embodiments of this application may be corresponding to the terminal 100 in the communication methods shown in FIG. 5 and FIG. 6 in the embodiments of this application. In addition, operations and/or functions of modules in the communication apparatus 900 or the communication apparatus 1000 are used to implement corresponding procedures of the methods of the terminal 100 in FIG. 5 and FIG. 6. For brevity, details are not described herein again.

An embodiment of this application further provides a computer-readable storage medium. The computer-readable storage medium stores a computer program. When the program is executed by a processor, a procedure related to the terminal 100 in the communication method provided in the foregoing method embodiments may be implemented.

An embodiment of this application further provides a communication apparatus, and the communication apparatus may be a terminal or a circuit. The communication apparatus may be configured to perform an action performed by the terminal 100 in the foregoing method embodiment.

Figure 11:
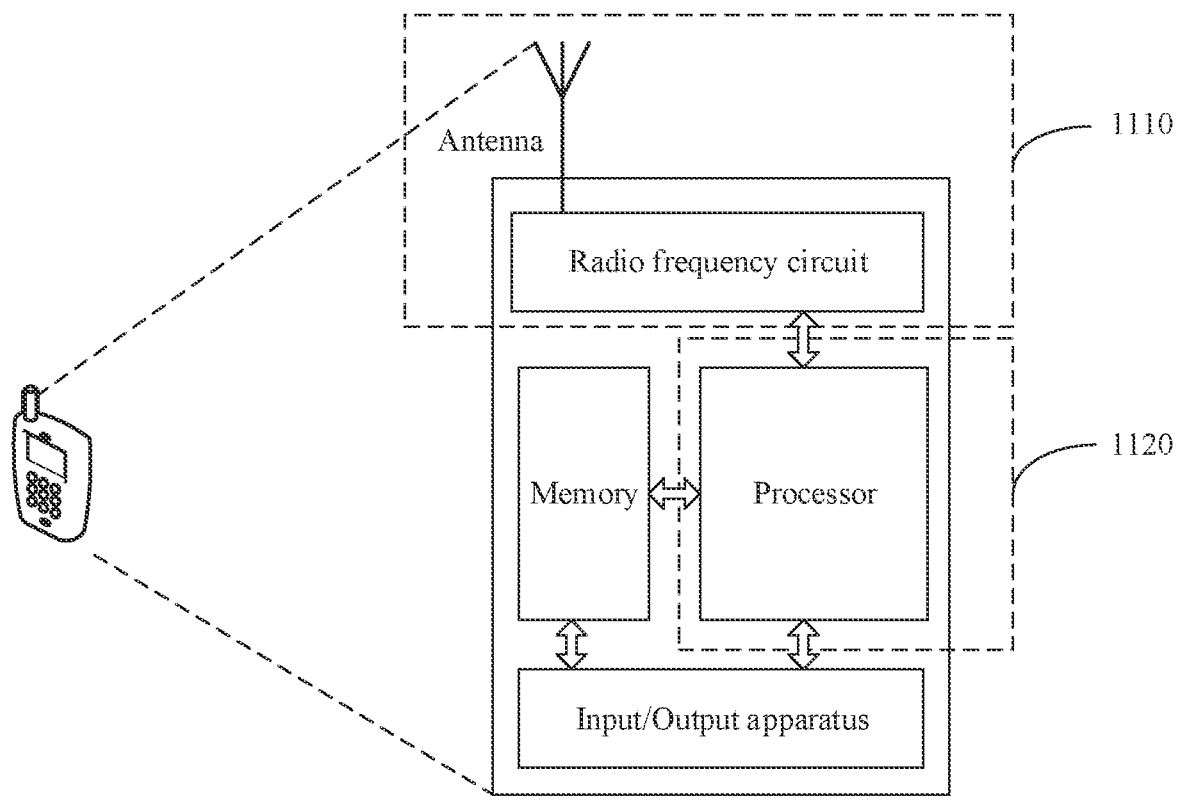
FIG. 11 is a schematic diagram 5 of a structure of a communication apparatus according to an embodiment of this application.

When the communication apparatus is a terminal, FIG. 11 is a simplified schematic diagram of a structure of the terminal device. For ease of understanding and illustration, an example in which the terminal is a mobile phone is used in FIG. 11. As shown in FIG. 11, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and data. A radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus such as a touchscreen, a display, or a keyboard is mainly configured to: receive data entered by a user, and output data to the user. It should be noted that some types of terminals may not have the input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 11, the terminal includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1110 is configured to perform a sending operation and a receiving operation on a terminal side in the foregoing method embodiment, and the processing unit 1120 is configured to perform an operation other than the receiving/sending operation of the terminal in the foregoing method embodiments.

For example, in an implementation, the transceiver unit 1110 is configured to perform the receiving operation on the terminal side in step 501a and step 501b or the sending operation on the terminal side in step 501a and step 501b in FIG. 5, and is further configured to perform step 504, step 505, step 507, and so on. Certainly, the transceiver unit 1110 is further configured to perform another transceiver step on the terminal side in the embodiments of this application. The processing unit 1120 is configured to perform step 502, step 503, and step 506 in FIG. 5, and/or the processing unit 1120 is further configured to perform another processing step on the terminal side in the embodiments of this application.

For another example, in still another implementation, the transceiver unit 1110 is configured to perform the receiving operation on the terminal side in step 601a in FIG. 6 or the sending operation on the terminal side in step 601a in FIG. 6, and/or the transceiver unit 1110 may be further configured to perform step 602, step 604, step 605, and step 606. The transceiver unit 1110 is further configured to perform another transceiver step on the terminal side in the embodiments of this application. The processing unit 1120 is configured to perform another processing step on the terminal side in the embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 12:
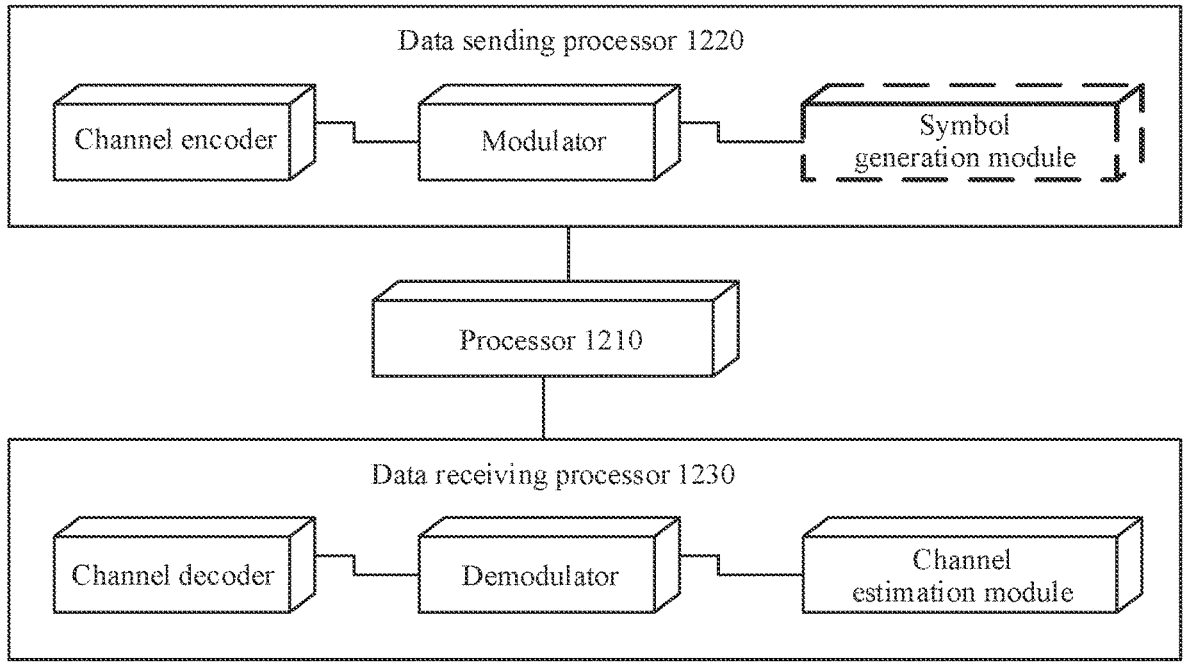
FIG. 12 is a schematic diagram 6 of a structure of a communication apparatus according to an embodiment of this application.

When the communication apparatus in this embodiment is a terminal, refer to a device shown in FIG. 12. For example, the device can implement functions similar to those of the processor 810 in FIG. 8. In FIG. 12, the device includes a processor 1210, a data sending processor 1220, and a data receiving processor 1230. The processing module 710 in the foregoing embodiment may be the processor 1210 in FIG. 12, and implements a corresponding function. The transceiver module 720 in the foregoing embodiment may be the data sending processor 1220 and/or the data receiving processor 1230 in FIG. 12. Alternatively, in the foregoing embodiment, the sending module 910 may be the data sending processor 1220 in FIG. 12, and the receiving module 920 may be the data receiving processor 1230 in FIG. 12. Although FIG. 12 shows a channel encoder and a channel decoder, it may be understood that the modules are merely examples, and do not constitute a limitation on this embodiment.

Figure 13:
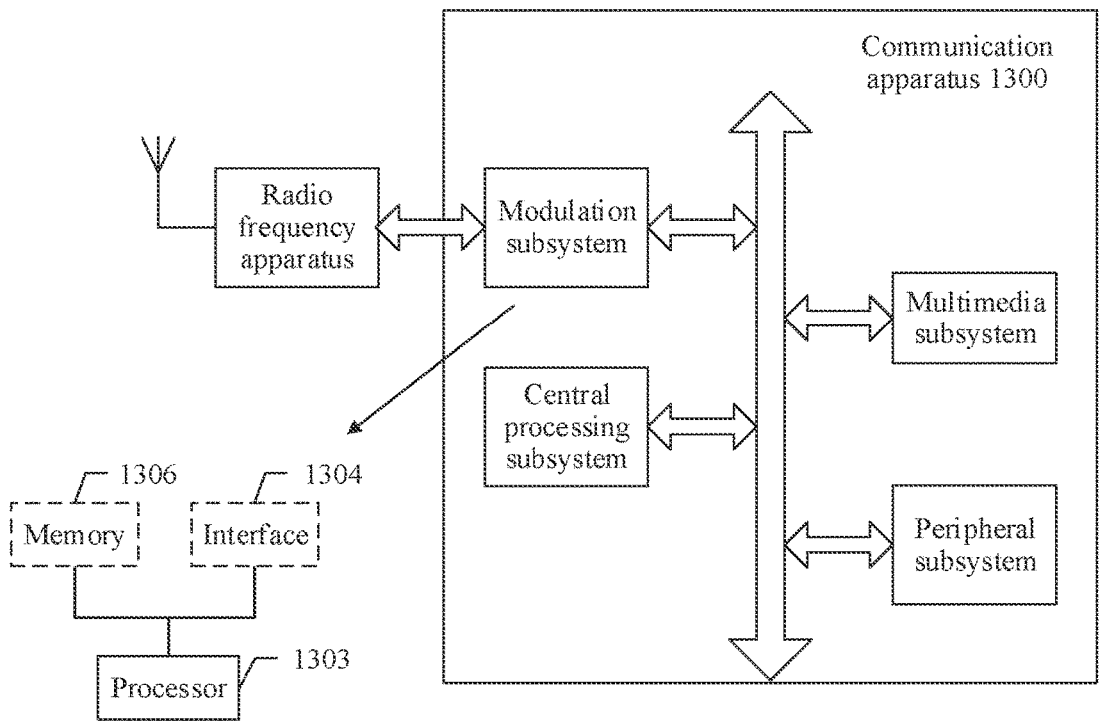
FIG. 13 is a schematic diagram 7 of a structure of a communication apparatus according to an embodiment of this application.

FIG. 13 shows another form of the communication apparatus in this embodiment. The communication apparatus 1300 includes modules such as a modulation subsystem, a central processing subsystem, and a peripheral subsystem. The communication apparatus in this embodiment may be used as the modulation subsystem. Specifically, the modulation subsystem may include a processor 1303 and an interface 1304. The processor 1303 implements a function of the processing module 710, and the interface 1304 implements a function of the transceiver module 720. Alternatively, the interface 1304 may further complete functions of the sending module 910 and/or the receiving module 920. In another variation, the modulation subsystem includes a memory 1306, a processor 1303, and a program that is stored in the memory 1306 and that can be run on the processor. When executing the program, the processor 1303 implements the method on the terminal side in the foregoing method embodiment. It should be noted that the memory 1306 may be a nonvolatile memory or a volatile memory. The memory 1306 may be located in the modulation subsystem, or may be located in the communication apparatus 1300, provided that the memory 1306 can be connected to the processor 1303.

Figure 14:
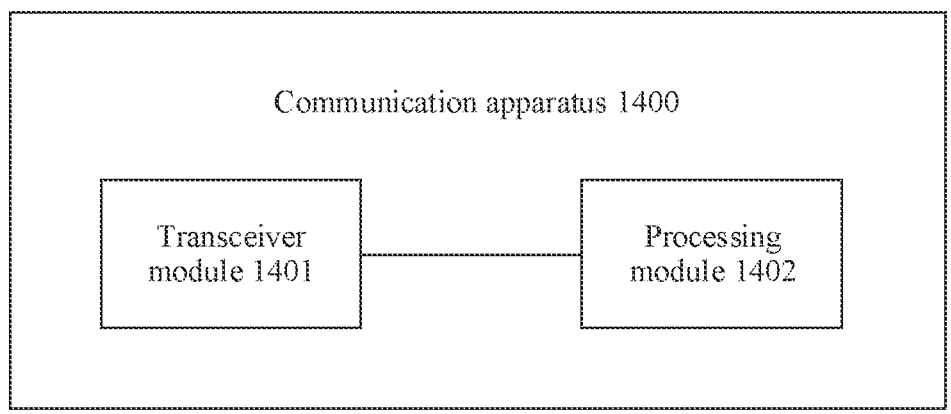
FIG. 14 is a schematic diagram 8 of a structure of a communication apparatus according to an embodiment of this application.

FIG. 14 is a schematic block diagram of a communication apparatus 1400 according to an embodiment of this application. The communication apparatus 1400 may be the first network side device or the second network side device described above. The network side device 2 is used as an example. In FIG. 14, the communication apparatus 1400 includes a transceiver module 1401 and a processing module 1402. The transceiver module 1401 is configured to perform the receiving operation of the network side device 2 in step

501*b* or the sending operation of the network side device 2 in step 501*b* in FIG. 5, and is further configured to perform step 505, step 507, and so on. The processing module 1402 is configured to perform another processing step of the network side device 2 in the embodiments of this application.

Alternatively, the transceiver module 1401 is configured to perform step 602, step 604, and step 606 in FIG. 6. The transceiver module 1401 is further configured to perform another transceiver step of the network side device 2 in the embodiments of this application. The processing module 1402 is configured to perform step 603 shown in FIG. 6, and may be further configured to perform another processing step on the terminal side in the embodiments of this application.

It should be understood that the transceiver module 1401 in this embodiment of this application may include a receiving module and a sending module. For example, the transceiver module 1401 may be implemented by a transceiver or a transceiver-related circuit component.

Figure 15:
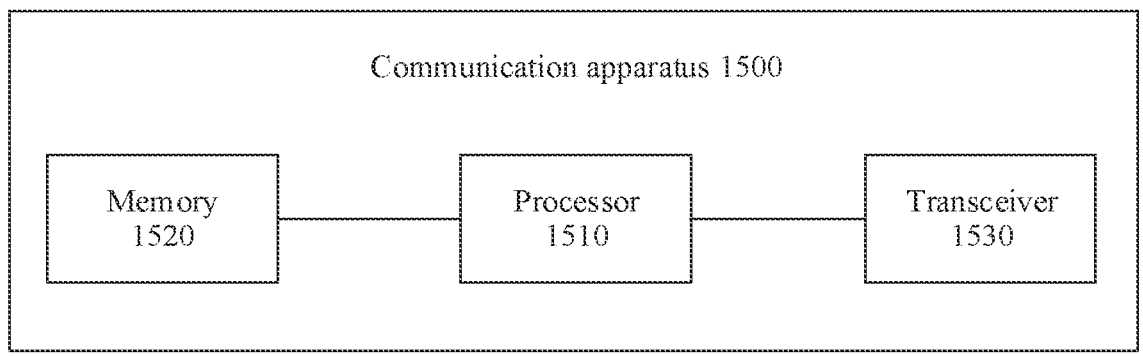
FIG. 15 is a schematic diagram 9 of a structure of a communication apparatus according to an embodiment of this application.

As shown in FIG. 15, an embodiment of this application further provides a communication apparatus 1500. The communication apparatus 1500 may be the foregoing first network side device or the second network side device. The communication apparatus 1500 includes a processor 1510, a memory 1520, and a transceiver 1530. The memory 1520 stores instructions or a program. The processor 1510 is configured to execute the instructions or the program stored in the memory 1520. When the instructions or the program stored in the memory 1520 are or is executed, the processor 1510 is configured to perform an operation performed by the processing module 1402 in the foregoing embodiment, and the transceiver 1530 is configured to perform an operation performed by the transceiver module 1401 in the foregoing embodiment.

Figure 16:
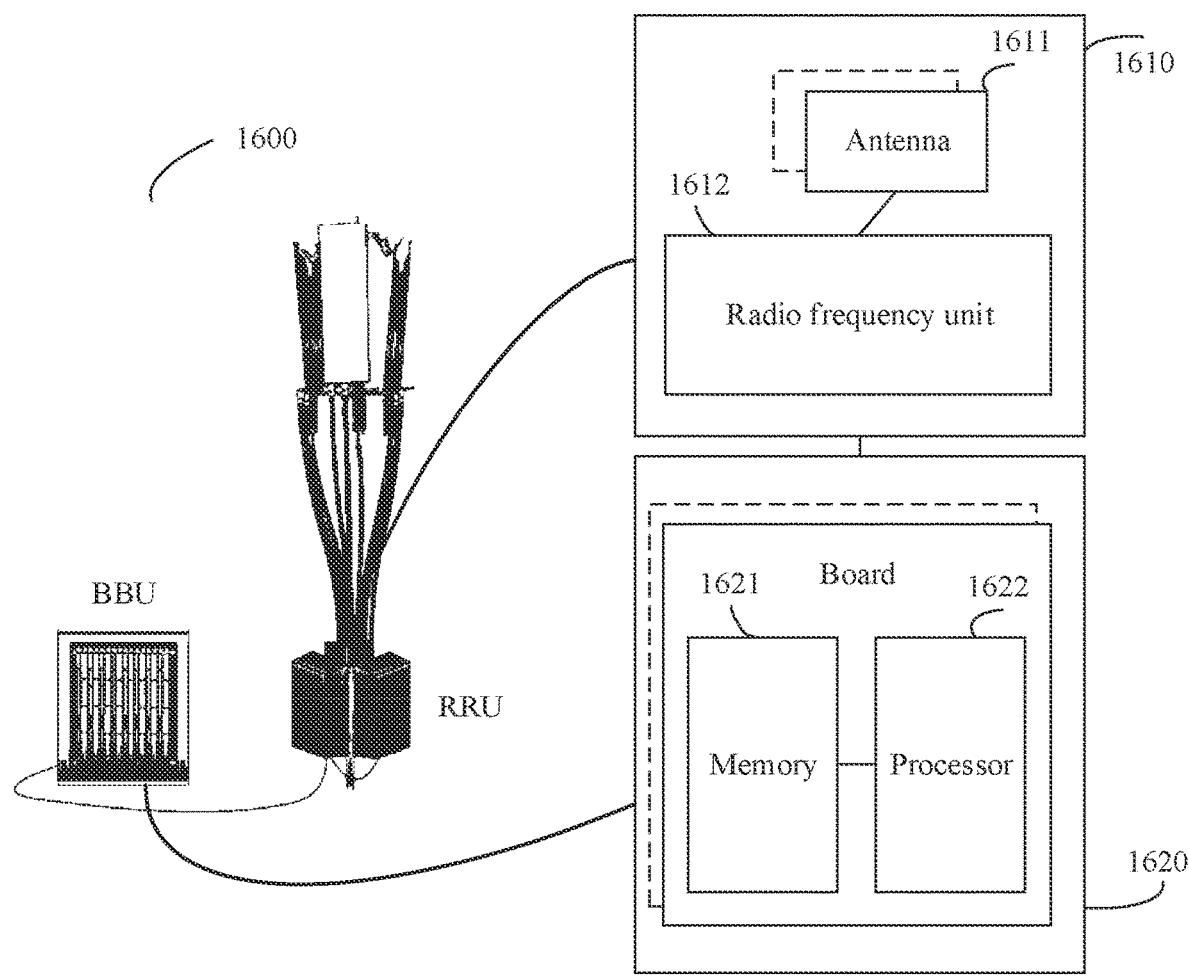
FIG. 16 is a schematic diagram 10 of a structure of a communication apparatus according to an embodiment of this application.

When the communication apparatus in this embodiment is a network side device, the network side device may be shown in FIG. 16. An apparatus 1600 includes one or more radio frequency units, such as a remote radio unit (remote radio unit, RRU) 1610 and one or more baseband units (baseband unit, BBU) (which may also be referred to as digital units (digital unit, DU)) 1620. The RRU 1610 may be referred to as a transceiver module, and corresponds to the transceiver module 1401 in FIG. 14. Optionally, the transceiver module may also be referred to as a transceiver machine, a transceiver circuit, a transceiver, or the like, and may include at least one antenna 1611 and a radio frequency unit 1612. The RRU 1610 is mainly configured to: receive and send a radio frequency signal, and perform conversion between the radio frequency signal and a baseband signal. For example, the RRU 1610 is configured to send indication information to a terminal. The BBU 1620 is mainly configured to: perform baseband processing, control a base station, and so on. The RRU 1610 and the BBU 1620 may be physically disposed together, or may be physically disposed separately, that is, in a distributed base station.

The BBU 1620 is a control center of the base station, and may also be referred to as a processing module. The BBU 1620 may correspond to the processing module 1420 in FIG. 14, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1620 may include one or more boards, and a plurality of boards may jointly support a radio access network (for example, an LTE network) having a single access standard, or may separately support radio access networks (for example, an LTE network, a 5G network, or another network) having different access standards. The BBU 1620 further includes a memory 1621 and a processor 1622. The memory 1621 is configured to store necessary instructions and data. The processor 1622 is configured to control the base station to perform a necessary action, for example, configured to control the base station to perform an operation procedure related to the network device in the foregoing method embodiments. The memory 1621 and the processor 1622 may serve the one or more boards. In other words, the memory and the processor may be disposed on each board. Alternatively, a plurality of boards may share a same memory and a same processor. In addition, a necessary circuit may be further disposed on each board.

It should be understood that, the processor mentioned in the embodiments of this application may be a central processing unit (Central Processing Unit, CPU), the processor may further be another general purpose processor, a digital signal processor (Digital Signal Processor, DSP), an application specific integrated circuit (Application Specific Integrated Circuit, ASIC), a field programmable gate array (Field Programmable Gate Array, FPGA), or another programmable logic device, discrete gate or transistor logic device, discrete hardware component, or the like. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that, the term "and/or" in this specification describes only an association relationship between associated objects, and indicates that three relationships may exist. For example, A and/or B may indicate the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a terminal, that a first transmission resource conflicts with a second transmission resource, wherein:
   the first transmission resource is a resource used by the terminal to send first information to a first network side device,
   the first network side device corresponds to a first user identity supported by the terminal,
   the second transmission resource is a resource used by the terminal to send second information to a second network side device, and
   the second network side device corresponds to a second user identity supported by the terminal;
   determining, by the terminal, that a priority of the first information is higher than a priority of the second information based on a sending periodicity of the first information and a sending periodicity of the second information;
   sending, by the terminal, the first information on the first transmission resource; and
   canceling, by the terminal, sending the second information on the second transmission resource; or sending, by the terminal, the second information on a third transmission resource, wherein the third transmission resource is a resource before or after the second transmission resource,
   wherein the first information is first control information, and the second information is second control information;
   wherein the first control information comprises at least one of the following information:
   an uplink scheduling request (SR), channel state information (CSI), hybrid automatic repeat request (HARQ) feedback information, or CSI feedback information; and
   wherein the second control information comprises at least one of the following information:
   an SR, CSI, HARQ feedback information, or CSI feedback information.

2. The communication method according to claim 1, wherein the communication method further comprises:
   sending, by the terminal, first indication information to the second network side device, wherein the first indication information indicates that the first transmission resource of the terminal conflicts with the second transmission resource.

3. The communication method according to claim 2, wherein the communication method further comprises:
sending, by the terminal, second indication information to the second network side device, wherein the second indication information indicates that the terminal cancels sending the second information on the second transmission resource.

4. The communication method according to claim 3, wherein:
the first indication information comprises at least one of:
information about an overlapped resource of the first transmission resource and the second transmission resource, or
a configuration type of the second information; or
the second indication information comprises at least one of:
information about an overlapped resource of the first transmission resource and the second transmission resource, or
a configuration type of the second information.

5. The communication method according to claim 3, wherein the second indication information carries cancellation reason indication information, and the cancellation reason indication information indicates a transmission conflict between the second information and the first information on a single transmission (Tx) link of the terminal.

6. The communication method according to claim 1, wherein the first information is HARQ-ACK, and the second information is HARQ-NACK.

7. A communication apparatus, comprising:
at least one processor; and
one or more memories coupled to the at least one processor and storing program instructions for execution by the at least one processor to:
determine that a first transmission resource conflicts with a second transmission resource, wherein:
the first transmission resource is a resource used by the communication apparatus to send first information to a first network side device,
the first network side device corresponds to a first user identity supported by the communication apparatus,
the second transmission resource is a resource used by the communication apparatus to send second information to a second network side device, and
the second network side device corresponds to a second user identity supported by the communication apparatus;
determine that a priority of the first information is higher than a priority of the second information based on a sending periodicity of the first information and a sending periodicity of the second information;
send the first information on the first transmission resource; and
cancel sending the second information on the second transmission resource; or send the second information on a third transmission resource, wherein the third transmission resource is a resource before or after the second transmission resource,
wherein the first information is first control information, and the second information is second control information;
wherein the first control information comprises at least one of the following information:
an uplink scheduling request (SR), channel state information (CSI), hybrid automatic repeat request (HARQ) feedback information, or CSI feedback information; and
wherein the second control information comprises at least one of the following information.

8. The communication apparatus according to claim 7, wherein the one or more memories store the program instructions for execution by the at least one processor to send first indication information to the second network side device, wherein the first indication information indicates that the first transmission resource of the communication apparatus conflicts with the second transmission resource.

9. The communication apparatus according to claim 8, wherein the one or more memories store the program instructions for execution by the at least one processor to send second indication information to the second network side device, wherein the second indication information indicates that the communication apparatus cancels sending the second information on the second transmission resource.

10. The communication apparatus according to claim 9, wherein:
the first indication information comprises at least one of:
information about an overlapped resource of the first transmission resource and the second transmission resource, or
a configuration type of the second information; or
the second indication information comprises at least one of:
information about an overlapped resource of the first transmission resource and the second transmission resource, or
a configuration type of the second information.

11. The communication apparatus according to claim 9, wherein the second indication information carries cancellation reason indication information, and the cancellation reason indication information indicates a transmission conflict between the second information and the first information on a single transmission (Tx) link of the communication apparatus.

12. The communication apparatus according to claim 7, wherein the first information is HARQ-ACK, and the second information is HARQ-NACK.

13. A communication apparatus, comprising:
at least one processor; and
one or more memories coupled to the at least one processor and storing program instructions for execution by the at least one processor to:
when a conflict exists between data transmission on a first transmission resource and a second transmission resource, send first configuration information to a second network side device, wherein:
the first configuration information indicates a third transmission resource,
the first transmission resource is a resource used by the communication apparatus to send first information to a first network side device,
the second transmission resource is a resource used by the communication apparatus to send second information to a second network side device, and
the third transmission resource is a resource recommended by the communication apparatus to be configured by the second network side device; and receive first response information that is sent by the second network side device and that is based on the first configuration information, wherein:
    the first response information indicates a fourth transmission resource that is reconfigured by the second network side device for the communication apparatus and that is used to transmit the second information, or
    the first response information indicates that the second network side device allows the communication apparatus to transmit the second information on the third transmission resource,
wherein the first network side device corresponds to a first user identity supported by the communication apparatus, and the second network side device corresponds to a second user identity supported by the communication apparatus, wherein the first information is first control information, and the second information is second control information;
wherein the first control information comprises at least one of the following information:
    an uplink scheduling request (SR), channel state information (CSI), hybrid automatic repeat request (HARQ) feedback information, or CSI feedback information; and
wherein the second control information comprises at least one of the following information:
    an SR, CSI, HARQ feedback information, or CSI feedback information.

14. The communication apparatus according to claim 13, wherein the first information is HARQ-ACK, and the second information is HARQ-NACK.

* * * * *

UNITED STATES PATENT AND TRADEMARK OFFICE
CERTIFICATE OF CORRECTION

Page 1 of 1

PATENT NO. : 12,238,748 B2
APPLICATION NO. : 17/692348
DATED : February 25, 2025
INVENTOR(S) : Junren Chang, Jifeng Li and Shulan Feng It is certified that error appears in the above-identified patent and that said Letters Patent is hereby corrected as shown below:

In the Claims

In Column 46, In Line 8, In Claim 7, delete "information." And insert -- information: an SR, CSI, HARQ feedback information, or CSI feedback information. --.

Signed and Sealed this
Twenty-second Day of July, 2025

Coke Morgan Stewart
*Acting Director of the United States Patent and Trademark Office*